(12) United States Patent
O'Shea et al.

(10) Patent No.: US 11,149,135 B2
(45) Date of Patent: Oct. 19, 2021

(54) APPLICATION OF CYCLODEXTRINS (CDS) FOR REMEDIATION OF PERFLUOROALKYL SUBSTANCES (PFASS)

(71) Applicants: Kevin E. O'Shea, Miami, FL (US); Mary Joelle Weiss-Errico, Miami, FL (US)

(72) Inventors: Kevin E. O'Shea, Miami, FL (US); Mary Joelle Weiss-Errico, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 267 days.

(21) Appl. No.: 15/944,359

(22) Filed: Apr. 3, 2018

(65) Prior Publication Data

US 2018/0282530 A1    Oct. 4, 2018

Related U.S. Application Data

(60) Provisional application No. 62/481,311, filed on Apr. 4, 2017.

(51) Int. Cl.
*C02F 1/28* (2006.01)
*C08L 5/16* (2006.01)
(Continued)

(52) U.S. Cl.
CPC ............... *C08L 5/16* (2013.01); *A01K 61/10* (2017.01); *A01K 97/045* (2013.01); *B08B 3/08* (2013.01);
(Continued)

(58) Field of Classification Search
CPC .................................................. C08B 37/0015
See application file for complete search history.

(56) References Cited

U.S. PATENT DOCUMENTS 3,453,257 A * 7/1969 Parmerter ........... C08B 37/0012
  536/46
6,024,879 A * 2/2000 Perly ....................... C02F 1/285
  210/635

(Continued)

FOREIGN PATENT DOCUMENTS

CN   102659206    9/2012
CN   103940961    7/2014
(Continued)

OTHER PUBLICATIONS

Qu et al, Equilibrium and kinetics study on the adsorption of perfluorooctanoic acid from aqueous solution onto powdered activated carbon, Mar. 26, 2009, Journal of Hazardous Materials, vol. 169, pp. 146-152. (Year: 2009).*

(Continued)

*Primary Examiner* — Matthew O Savage
(74) *Attorney, Agent, or Firm* — Saliwanchik, Lloyd & Eisenschenk

(57) ABSTRACT

A system for remediation of perfluoroalkyl substances (PFASs) has a multiplicity of β-cyclodextrins (β-CDs) and/or modified β-CDs combined with a vehicle additive, and a delivery device. Modified β-CDs can contain a single amine functionality at a single primary carbon or single secondary carbon of the β-CD. The vehicle additive can be powdered activated carbon (PAC). The delivery device is a column, a pouch, a packet, or a sheet that can permit the contacting of a fluid environment with the β-CDs and vehicle additive. The system of remediation can be used for a fluid environment or for biological organisms. CD-based fluorescent sensors can detect PFASs in the environment.

10 Claims, 10 Drawing Sheets

(51) Int. Cl.

| | |
|---|---|
| C08B 37/16 | (2006.01) |
| B08B 3/08 | (2006.01) |
| B09C 1/08 | (2006.01) |
| A01K 61/10 | (2017.01) |
| G01N 21/64 | (2006.01) |
| A01K 97/04 | (2006.01) |
| C02F 1/68 | (2006.01) |
| C02F 101/30 | (2006.01) |
| C02F 101/36 | (2006.01) |

(52) U.S. Cl.
CPC ............... *B09C 1/08* (2013.01); *C02F 1/285* (2013.01); *C02F 1/288* (2013.01); *C02F 1/683* (2013.01); *C08B 37/0015* (2013.01); *G01N 21/6428* (2013.01); *C02F 1/283* (2013.01); *C02F 1/688* (2013.01); *C02F 2101/301* (2013.01); *C02F 2101/36* (2013.01); *C08L 2205/025* (2013.01); *C08L 2205/03* (2013.01); *C08L 2205/035* (2013.01); *G01N 2021/6439* (2013.01); *Y02A 40/81* (2018.01)

(56) References Cited

U.S. PATENT DOCUMENTS

| | | | |
|---|---|---|---|
| 2014/0231352 A1 | 8/2014 | Suri et al. | |
| 2015/0314266 A1* | 11/2015 | Adachi | B01J 20/3219 562/605 |

FOREIGN PATENT DOCUMENTS

| | | | | |
|---|---|---|---|---|
| CN | 104624622 | 5/2015 | | |
| CN | 104783021 | 7/2015 | | |
| WO | WO 2014/095427 | 6/2014 | | |
| WO | WO-2015131066 A1 * | 9/2015 | .......... | B01J 20/3458 |

OTHER PUBLICATIONS

Abe, I. et al., "Characteristics of Cyclodextrin Adsorpotion onto Activated Carbons," *Journal of Colloid and Interface Science*, 2000, pp. 615-619, vol. 229.
Alsbaiee, A, et al., "Rapid Removal of Organic Micropollutants from Water by a Porous β-Cyclodextrin Polymer," *Nature*, 2016, 190-194, vol. 529.
Arvaniti, O.S. et al., "Review on the Occurrence, Fate, and Removal of Perfluorinated Compounds during Wastewater Treatment," *Sci. Total Environ.*, 2015, pp. 81-92, vol. 524-525.
Brady et al., "Working with Hazardous Chemicals," *Org. Synth.* 2000, 77, 220.
Crini, G. et al., "Synthesis and applications of adsorbents containing cyclodextrins," *J. Sep. Sci.*, 2002, pp. 789-813, vol. 25.
Crini, G., "Recent Developments in Polysaccharide-Based Materials Used as Adsorbents in Wastewater Treatment," *Prog. Polym. Sci.*, 2005, pp. 38-70, vol. 30.
Martin Del Valle, E.M., "Cyclodextrins and Their Uses: A Review," *Process Biochem.*, 2004, pp. 1033-1046, vol. 39.
Dudley, L-A. et al., *"Removal of Perfluoroalkyl Substances by PAC Adsorption and Anion Exchange,"* Water Research Foundation: Denver, CO, 2015.
Faraji, H. et al., "β-Cylodxtrin-Bonded Silica Particles as Novel Sorbent for Stir Bar Sorptive Extraction of Phenolic Compounds," *J. Chromatogr. Sci.*, 2011, 482-487, vol. 49.
Glassmeyer, S.T. et al., "Nationwide reconnaissance of contaminants of emerging concern in source and treated drinking waters of the United States," *Science of the Total Environment*, 2017, pp. 909-922, vol. 581-582.
Guo, W. et al., "NMR Study of Cyclodextrin Inclusion of Fluorocarbon Surfactants in Solution," *Langmuir*, 1992, 446-451, vol. 8.
Hocquelet, C. et al., "Synthesis of calixarene-cyclodextrin coupling products," *Tetrahedron*, 2016, pp. 11963-11971, vol. 62.

Hu, X.C. et al., "Detection of Poly- and Perfluoroalkyl Substances (PFASs) in US Drinking Water Linked to Industrial Sites, Military Fire Training Areas, and Wastewater Treatment Plants," *ES&T Letters*, 2016, 344-350, vol. 3.
Junquera, E. et al., "Effect of the Presence of β-Cyclodextrin on the Micellization Process of Sodium Dodecyl Sulfate or Sodium Perfluorooctanoate in Water," *Langmuir*, 1993, pp. 1213-1219, vol. 9.
Kania, N. et al., "Cyclodextrins absorbed onto activated carbons: Preparation, characterization, and effect on the dispersibility of the particles in water," *Journal of Colloid and Interface Science*, 2012, pp. 89-100, vol. 371.
Karoyo, A.H. et al., "Formation of Host-Guest Complexes of β-Cyclodextrin and Perfluorooctanoic Acid," *J. Phys. Chem. B*, 2011, pp. 9511-9527, vol. 115.
Karoyo, A.H. et al., "Characterization and Dynamic Properties for the Solid Inclusion Complexes of β-Cyclodextrin and Perfluorooctanoic Acid," *J. Phys. Chem. B*, 2013, pp. 8269-8282, vol. 117.
Karoyo, A.H. et al., "Counterion Anchoring Effect on the Structure of the Solid-State Inclusion Complexes of β-Cyclodextrin and Sodium Perfluorooctanoate," *J. Phys. Chem. C*, 2015, pp. 22225-22243, vol. 119.
Karoyo, A.H. et al., "Nano-Sized Cyclodextrin-Based Molecularly Imprinted Polymer Adsorbents for Perfluorinated Compounds—A Mini-Review," *Nanomaterials*, 2015, pp. 981-1003, vol. 5.
Lima, S. et al., "How Does β-Cyclodextrin Affect the Aggregation of Sodium Perfluoroheptanoate in Aqueous Solution: A $^{19}$F NMR Study," *J. Incl. Phenom. Macrocycl. Chem.*, 2007, pp. 157-162, vol. 57.
Liu, Y. et al. "Novel Permethylated β-Cylcodextrin Derivatives Appended with Chromophores as Efficient Fluorescent Sensors for the Molecular Recognition of Bile Salts," *J. Org. Chem.*, 2007, pp. 8227-8234, vol. 72.
Liu, D. et al., Perfluorooctaoic acid degradation iin the presence of Fe(III) under natural sunlight, *Journal of Hazardous Materials*, 2013, pp. 456-463, vol. 262.
Liu, W. et al., "A novel method of synthesizing cyclodextrin grafted multiwall carbon nanotubes/iron oxides and its adsorption of organic pullutant," *Applied Surface Science*, 2014, pp. 764-771, vol. 320.
No Lostro, P. et al., "Inclusion Compound from a Semifluorindated Alkane and β-Cylcodextrin," *Langmuir*, 2003, pp. 2313-2317, vol. 19.
Moulahcene, L. et al., "Inclusion and Removal of Pharmaceutical Residues from Aqueous Solution Using Water-Insoluble Cyclodextrin Polymers." *Chem. Eng. Res. Des.* 2015, 145-158, vol. 97.
Muderawan, I.W. et al., "A reliable synthesis of 2- and 6-amino-β-cylcodextrin and permethylated- β-cylcodextrin," *Tetrahedron Letters*, 2005, pp. 7905-7907, vol. 46.
Murakami T. et al., "Regioselective Sulfonation of a Secondary Hydroxyl Group of Cyclodextrins," *Tetrahedron Lett.*, 1987, pp. 321-324, vol. 28, No. 3.
Nagy, Z.M. et al., "Removal of Emerging Micropollutants from Water Using Cyclodextrin." *Sci. Total Environ.* 2014, pp. 711-719, vol. 485-486.
Ogoshi, T. et al., "Chemical Sensors Based on Cyclodextrin Derivatives," *Sensors*, 2008, pp. 4961-4982, vol. 8.
Palepu, R. et al., "Solution Inclusion Complexes of Cyclodextrins with Sodium Perfluorooctanoate," *Can. J. Chem.*, 1989, pp. 1550-1553, vol. 67.
Palepu, R. et al., "Binding Constants of β-Cyclodextrin/Surfactant Inclusion by Conductivity Measurements," *Langmuir*, 1989, pp. 218-221, vol. 5.
Park, J.W. et al., "Facile Dimerization and Circular Dichroism Characteristics of 6-O-(2-Sulfonato-6-naphthyl)-β-Cyclodextrin," *J. Phys. Chem.*, 2002, pp. 5177-5183, vol. 106.
Pessine, F.B.T.et al., "Review: Cyclodextrin Inclusion Complexes Probed by NMR Techniques," *Magnetic Resonance Spectroscopy*, InTech, 2012, pp. 237-264.
Qian, Y. et al., "Perfluorooctanoic Acid Degradation Using UV-Persulfate Process: Modeling of the Degradation and Chlorate Formation," *Environ. Sci. Technol.*, 2016, pp. 772-781, vol. 50.
Strynar, M. et al., "Identification of Novel Perfluoroalkyl Ether Carboxylic Acids (PFECAs) and Sulfonic Acids (PFESAs) in

(56) References Cited

OTHER PUBLICATIONS

Natural Waters Using Accurate Mass Time-of-Flight Mass Spectrometry (TOFMS)," *Environ. Sol. Technol.*, 2015, pp. 11622-11630, vol. 49.
Teranishi, K. et al., "Convenient Regioselective mono-2-O-Sulfonation of Cylomaltooctaose," *Biosci. Biotechnol. Biochem.*, 1998, pp. 1249-1252, vol. 62, No. 6.
Valente, A.J.M. et al., "The formation of host-guest complexes between surfactants and cyclodextrins," *Advances in Colloid and Interface Science*, 2014, pp. 156-176, vol. 205.
Wang, N. et al., "Adsorption of environmental pollutants using magnetic hydrid nanoparticles modified with β-cylcodextrin," *Applied Surface Science*, 2014, pp. 267-273, vol. 305.
Weiss, M.J. et al., "NMR Evaluation of Cyclodextrin-Perfluorinated Surfactant Host-Guest Interactions," *Proceedings from the 250th American Chemical Society National Meeting*, Boston, MA, Aug. 18, 2015.
Weiss, M.J. et al., "Effects of Environmental Factors on β-Cyclodextrin-Perfluorinated Surfactant Host-Guest Interactions," *Proceedings from the 251st American Chemical Society National Meeting*, San Diego, CA, Mar. 13, 2016.
Weiss-Errico, M.J. et al., "Detailed NMV investigation of cyclodextrin-perfluorinated surfactant interactions in aqueous media," *J. Hazardous Mat.*, 2017, pp. 57-65, vol. 329.
Wilson, L.D. et al., "A $^1$H NMR Study of Cyclodextrin-Hydrocarbon Surfactant Inclusion Complexes in Aqueous Solutions," *Can. J. Chem.*, 1998, pp. 25-34, vol. 76.
Wilson, L.D. et al., $^{19}$F and $^1$H NMR Investigation of Cyclodextrin/Fluorocarbon Alkyl Carboxylate Surfactant Inclusion Complexes, *Langmuir*, 1998, pp. 4710-4717, vol. 14.
Wilson, L.D. "Binding Studies of Cyclodextrin-Surfactant Complexes", Ph.D. Dissertation, University of Saskatchewan, Saskatoon, Canada, 1998.
Xiao, L. et al., β-Cylcodextrin Polymer Network Sequesters Perfluorooctanoic Acid at Environmentally Relevant Concentrations, *J. Am. Chem. Soc.*, 2017, pp. 7689-7692, vol. 139, No. 23.
Xing, H. et al., "NMR Studies on Selectivity of β-Cylcodextrin to Fluorinated/Hydrogenated Surfactant Mixtures," *J. Phys. Chem. B*, 2007, pp. 8089-8095, vol. 111.
Zhang, H. et al., "Complex Formation of β-Cyclodextrin- and Perfluorocarbon-Modified Water-Soluble Polymers," *Langmuir*, 1998, pp. 4972-4977, vol. 14.
Zhao, D. et al., "Synthesis and properties of water-insoluble β-cyclodextrin polymer crosslinked by citric acid with PEG-400 as modifier," *Carbohydrate Polymers*, 2009, pp. 125-130, vol. 78.
Zhao, D. et al., "Water soluble β-cyclodextrin polymer crosslinked by citric acid: synthesis and adsorption properties toward phenol and methylene blue," *J Incl Phenom Macrocyel Chem*, 2009, pp. 195-201, vol. 63.

* cited by examiner

APPLICATION OF CYCLODEXTRINS (CDS) FOR REMEDIATION OF PERFLUOROALKYL SUBSTANCES (PFASS)

CROSS-REFERENCE TO A RELATED APPLICATION

This application claims the benefit of U.S. Provisional Application Ser. No. 62/481,311, filed Apr. 4, 2017, the disclosure of which is hereby incorporated by reference in its entirety, including all figures, tables and drawings.

BACKGROUND OF INVENTION

Perfluoroalkyl substances (PFASs) are problematic pollutants detrimental to environmental and human health, and have been classified as contaminants of emerging concern. PFASs have been utilized by various industries due to their unique properties, such as high chemical and thermal stability, arising from their numerous carbon-fluorine bonds.

The most widespread PFASs are perfluorinated surfactants, characterized by a fluorinated carbon chain and a variety of polar functional groups, including but not limited to carboxylic acids, sulfonates, sulfonamides, phosphates, and ethers. This dual nature renders them both hydrophobic and lipophobic. They have been used in fluoropolymer synthesis, fire-fighting foams for oil fires, and stain-, grease-, and water-repellants in consumer products. Due to this widespread use and their incredible stability, PFASs have been detected in wildlife, humans, and the environment. Furthermore, exposure to PFASs has been linked to various cancers, thyroid disease, developmental delays, and infertility. Although many of these compounds have been phased out of production, they are still detected in drinking water supplies. A number of industries have also replaced traditional PFASs with new "emerging" PFASs, such as PFASs with ether functionalities (PFECAs).

PFECAs have a structure similar to perfluorocarboxylic acids, except that oxygen atoms are inserted into the fluorinated alkyl chain to create mono-, di-, and triether functionalities. The rationale behind adding ether functionalities is to enhance the chemical and biological degradability while retaining the desired properties arising from the perfluorinated structure. Preliminary data suggest that the addition of oxygen does not significantly change their susceptibility to degradation, and they have similar persistence and potential for transport in the environment as legacy PFASs. PFECAs are resistant to chemical and biological oxidation and were recently detected at high levels at one of the most advanced municipal water treatment plants in the US.

A joint study by the United States Environmental Protection Agency (EPA) and United States Geological Survey (USGS), Glassmeyer et al., *Sci. Total Environ.* 2017, 581-582, 909-922, found that PFASs are present in drinking water at the parts per trillion level (1-100 ppt), and that current water treatment processes do not remove, and can even sometimes concentrate, PFASs in the water supply. In May 2016 the EPA set a combined health advisory concentration of 70 ppt for perfluorooctanoic acid (PFOA) and perfluorooctane sulfonate (PFOS), two of the most problematic PFASs. As an estimated six million Americans drink water exceeding this limit, remediation methods are greatly needed.

Presently, there is no satisfactory removal method for PFASs. Previous studies for PFAS removal include adsorption onto granular or powdered activated carbon, mineral materials, and carbon nanotubes; nanofiltration and reverse osmosis; and advanced oxidation processes such as hydrogen peroxide photolysis, photocatalysis, photo-Fenton reactions, and ultrasonic degradation. In general, these methods have marginal or limited levels of success and have primarily been studied under laboratory conditions that often require high temperatures and high pressures. Such conditions are difficult and/or not practical to replicate under real treatment conditions, and at high PFAS concentrations, which do not accurately reflect environmental conditions. These methods typically require expensive equipment and/or long reaction or contact times, and may only transform longer chain PFASs to shorter chain adducts which can retain the potent detrimental biological activity associated with the parent PFASs. Given their extreme resistance to chemical and oxidative remediation, adsorption of PFASs appears to be a more promising strategy for their removal from water.

An adsorptive technology based on the dual hydrophobic/hydrophilic nature of PFASs would be ideal for removal. Cyclodextrins (CDs) have been shown to complex strongly with PFASs. (Guo et al., *Langmuir* 1992, 8, 446-51, Xing et al., *J. Phys. Chem. B* 2007, 111, 8089-95, Karoyo et al., *J. Phys. Chem. B* 2011, 115, 9511-27, Palepu et al., *Can. J. Chem.* 1989, 67, 1550-53, Junquera et al., *Langmuir* 1993, 9, 1213-19, and Wilson and Verall, *Langmuir* 1992, 14, 4710-7) The development of systems to employ CDs effectively for the isolation and removal of PFASs is desirable.

SUMMARY OF THE INVENTION

Embodiments of the invention are directed to a system for remediation of perfluoroalkyl substances (PFASs), including perfluoroethercoarboxylic acids (PFECAs), that comprises a multiplicity of cyclodetrins (CDs) including α-cyclodextrins (α-CDs), β-cyclodextrins (β-CDs), and γ-cyclodextrins, (γ-CDs) and/or modified CDs, optionally, a vehicle additive, and a delivery device. A modified CD can contain a single amine functionality at a single primary carbon or single secondary carbon of the CD. The vehicle additive can be powdered activated carbon (PAC). The delivery device is a column, a pouch, a packet, or a sheet.

Another embodiment of the invention is directed to a method for remediation of PFASs from an environment, where a system for remediation of PFASs comprising CDs and/or modified CDs, optionally, a vehicle additive, and a delivery device is contacted with an environment and removing the PFASs as complexes to CDs in the system for remediation of PFASs from the environment. The environment can be a fluid environment, a soil environment, a solid surface, a plant or an animal, or a human. The PFASs complexed to the CDs and modified CDs can be removed from the environment with the system.

Another embodiment of the invention is directed to a CD-based fluorescent sensors for the detection of PFASs in water, comprising a fluorescence moiety complexed to a CD. The fluorescence moiety can be naphthalene, anthracene, phenanthrene, or dansyl-leucine that can provide a strong florescence signal when released from the CD.

DETAILED DISCLOSURE

Figure 1:
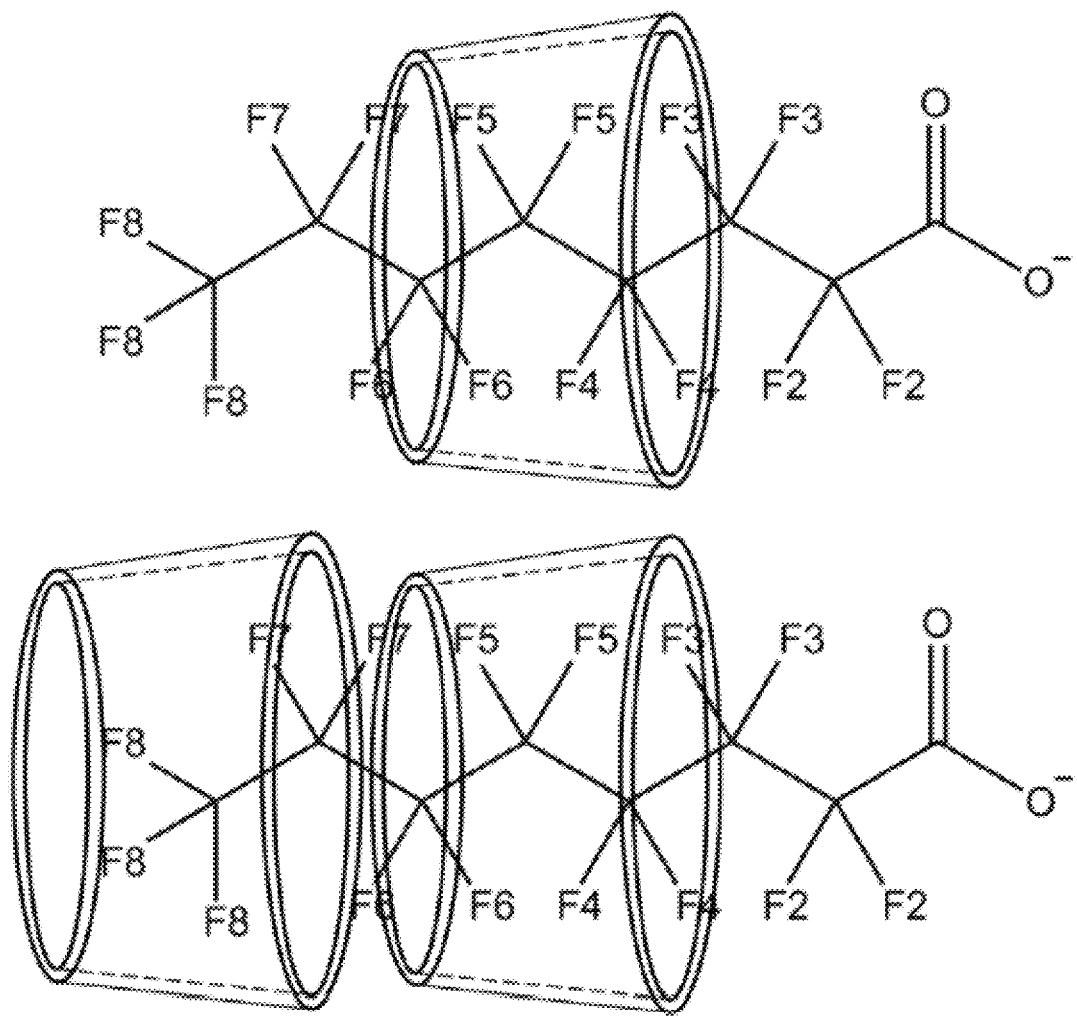
FIG. 1 shows drawings of the conceptual 1:1 and 2:1 β-CD:PFAS complexes for the PFAS perfluorooctanoic acid (PFOA).

In embodiments of the invention, cyclodextrins (CDs) are employed as hosts to trap PFAS guests as a method for environmental remediation comprising CDs, including CDs in a synergistic vehicle or CDs that are modified or employed in a composition to enhance adsorption of PFASs and removal of the CD-PFASs complexes from the environment. In embodiments of the invention, the environment for removal of the PFASs is human serum, bodies of water, and water systems. In another embodiment of the invention, the CDs can be used as a host for agents for the detection and quantification of PFASs in an environment. CDs, composed of simple glucose sugar residues, are inexpensive, abundant, renewable, water soluble, and non-toxic. The three most common cyclodextrins are α-, β-, and γ-CD, composed of six, seven, and eight glucose monomers respectively. CDs have been shown to remove various environmental pollutants such as PCBs, phenols, dyes, pharmaceuticals, and heavy metals from aqueous media. Cyclodextrins are macrocyclic molecules with a hydrophilic exterior due to the alcohol functionalities and a hydrophobic interior lined with C—H bonds. The dual hydrophobic/hydrophilic nature of CDs makes them attractive for a variety of host-guest chemistry-based applications. A hydrophobic guest partitions favorably from the polar aqueous media into the cyclodextrin cavity. With their hydrophobic tail and hydrophilic head, PFASs can partition into the cyclodextrin cavity, while the functional head group can remain in aqueous solution and interact with the hydroxyl groups on the cyclodextrin via hydrogen bonding. PFASs that can be complexed by CDs include, but are not limited to those listed in Table 1, below.

TABLE 1

PFASs and PFECAs that can be absorbed by β-CD

| Name | CAS # | Formula | Mol. Wt. |
| --- | --- | --- | --- |
| PFASs without an ether group ($C_nHF_{2n-1}O_2$) | | | |
| Perfluorobutanoic acid (PFBA = C4) | 375-22-4 | $C_4HF_7O_2$ | 214.0 |
| Perfluoropentanoic acid (PFPA = C5) | 2706-90-3 | $C_5HF_9O_2$ | 264.0 |
| Perfluorohexanoic acid (PFHxA = C6) | 307-24-4 | $C_6HF_{11}O_2$ | 314.1 |
| Pefluoroheptanoic acid (PFHpA = C7) | 375-85-9 | $C_7HF_{13}O_2$ | 364.1 |
| Perfluorooctanoic acid (PFOA = C8) | 335-67-1 | $C_8HF_{15}O_2$ | 414.1 |
| Perfluorononanoic acid (PFNA = C9) | 375-95-1 | $C_9HF_{17}O_2$ | 464.1 |
| Perfluorodecanoic acid (PFDA = C10) | 335-76-2 | $C_{10}HF_{19}O_2$ | 514.1 |
| PFECAs with one ether group ($C_nHF_{2n-1}O_3$) | | | |
| Perfluoro-2-methoxyacetic acid (PFMOAA) | 674-13-5 | $C_3HF_5O_3$ | 180.0 |

TABLE 1-continued

PFASs and PFECAs that can be absorbed by β-CD

| Name | CAS # | Formula | Mol. Wt. |
|---|---|---|---|
| Perfluoro-3-methoxypropanoic acid (PFMOPrA) | 377-73-1 | $C_4HF_7O_3$ | 230.0 |
| Perfluoro-4-methoxybutanoic acid (PFMOBA) | 863090-89-5 | $C_5HF_9O_3$ | 280.0 |
| Perfluoro-2-propoxypropanoic acid (PFPrOPrA) ("GenX") | 13252-13-6 | $C_6HF_{11}O_3$ | 330.1 |
| Perfluoro-4-dimethylmethoxy-butanoic acid (PFDMMOBA) | 801212-59-9 | $C_7HF_{13}O_3$ | 380.1 |
| PFECAs with two ether groups ($C_nHF_{2n-1}O_4$) | | | |
| Perfluoro(3,5-dioxahexanoic) acid (PFO2HxA) | 39492-88-1 | $C_4HF_7O_4$ | 246.0 |
| Perfluoro(3,6-dioxaheptanoic) acid (PFO2HpA) | 151772-58-6 | $C_5HF_9O_4$ | 296.0 |
| Perfluoro(3,6-dioxadecanoic) acid (PFO2DA) | 137780-69-9 | $C_8HF_{15}O_4$ | 446.1 |
| PFECAs with three ether groups ($C_nHF_{2n-1}O_5$) | | | |
| Perfluoro(3,5,7-trioxaoctanoic) acid (PFO3OA) | 39492-89-2 | $C_5HF_9O_5$ | 312.0 |
| Perfluoro(3,6,9-trioxadecanoic) acid (PFO3DA) | 151772-59-7 | $C_7HF_{13}O_5$ | 412.1 |

A detailed comprehensive Nuclear Magnetic Resonance (NMR) spectral study of the complexation of PFASs to β-CD was conducted, Weiss-Errico and O'Shea, *J. Hazardous Mat.* 2017 329, 57-65, with highlights herein. The encapsulation of PFASs by β-cyclodextrin has been found to be strong, with 95% encapsulation of PFASs at a 1:1 guest:host ratio between PFAS and β-CD, and over 99% encapsulation in the presence of excess β-CD. The study determined that although the polar head group of a PFAS had a modest influence on host-guest complexation, for PFASs with backbones longer than six carbons, strong association constants are observed for 1:1 ($K_{1:1} \sim 10^5$ $M^{-1}$) and 2:1 ($K_{2:1} \sim 10^3$ $M^{-1}$) β-CD:PFAS complexes, as shown in FIG. 1. Competition studies with adamantane-carboxylic acid and phenol confirmed the persistence of the β-CD: PFAS complex. The aqueous solution pH, ionic strength, and the presence of humic acid have only a modest influence on the β-CD:PFAS complexes. Table 2 gives the association constants for β-CD complexes with a sample of the PFASs studied, including perfluoroheptanoic acid (PFHpA), perfluorooctanoic acid (PFOA), perfluorononanoic acid (PFNA), perfluorooctane sulfonate (PFOS), and perfluorooctanesulfonamide (PFOSA).

TABLE 2

Association constants for 1:1 and 2:1 complexes of β-CD:PFAS complexes in aqueous media at room temperature.

| Compound | PFHpA | PFOA | PFNA | PFOS[a] | PFOSA |
|---|---|---|---|---|---|
| $K_{1:1}$, $M^{-1}$ | 4.30 ± 0.85 × $10^5$ | 5.00 ± 0.10 × $10^5$ | 3.37 ± 0.35 × $10^5$ | 6.96 ± 0.79 × $10^5$ | 1.02 ± 0.16 × $10^5$ |
| $K_{2:1}$, $M^{-1}$ | 2.30 ± 0.27 × $10^3$ | 1.20 ± 0.50 × $10^3$ | 7.80 ± 0.66 × $10^3$ | 5.95 ± 1.70 × $10^4$ | 2.70 ± 0.57 × $10^4$ |

[a] 75.4 % linear isomer

TABLE 1-continued

PFASs and PFECAs that can be absorbed by β-CD

| Name | CAS # | Formula | Mol. Wt. |
|---|---|---|---|
| Perfluoro(3,6,9-trioxatridecanoic) acid (PFO3TDA) | 330562-41-9 | $C_{10}HF_{19}O_5$ | 562.1 |
| PFECAs with four ether groups ($C_nHF_{2n-1}O_6$) | | | |
| Perfluoro(3,5,7,9-tetraoxadecanoic) acid (PFO4DA) | 39492-90-5 | $C_6HF_{11}O_6$ | 378.1 |
| PFASs wit Sulfonic acid group | | | |
| Perfluorobutane sulfonic acid (PFBS) | 375-73-5 | $C_4HF_9SO_3$ | 300.1 |
| Perfluorohexane sulfonic acid (PFHxS) | 355-46-4 | $C_6HF_{13}SO_3$ | 400.1 |
| Perfluorooctane sulfonic acid (PFOS) | 1763-23-1 | $C_8HF_{17}SO_3$ | 500.1 |
| 6:2 Fluorotelomer sulfonic acid (6:2 FtS) | 6164-3-06 | $C_8H_5F_{13}SO_3$ | 428.2 |

Figure 2:
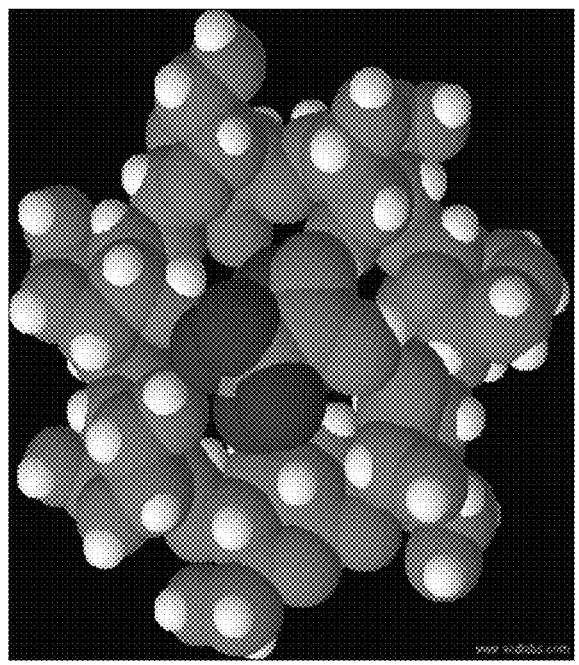
FIG. 2 shows a space filling model of β-CD with a PFAS where the β-CD cavity has a very favorable cross-section for complexing with a PFAS, where the space filling model was generated using ACD/ChemSketch software.

The incredible strength of complexation between β-CD and PFASs arises from the physical size of the molecules. β-CD has a cavity cross-section of 30.2 Å$^2$ and a cavity volume of 262 Å$^3$ that well receives a straight chain fluorocarbon that has a cross-section of 28.3 Å$^2$ and requires a volume of 249 Å$^3$ for a 3 carbon segment. This tight fit allows strong favorable van der Waals interactions between the CD cavity and PFAS chain. The advantageous inclusion of a guest PFAS within a host β-CD is illustrated in FIG. 2.

Figure 3:
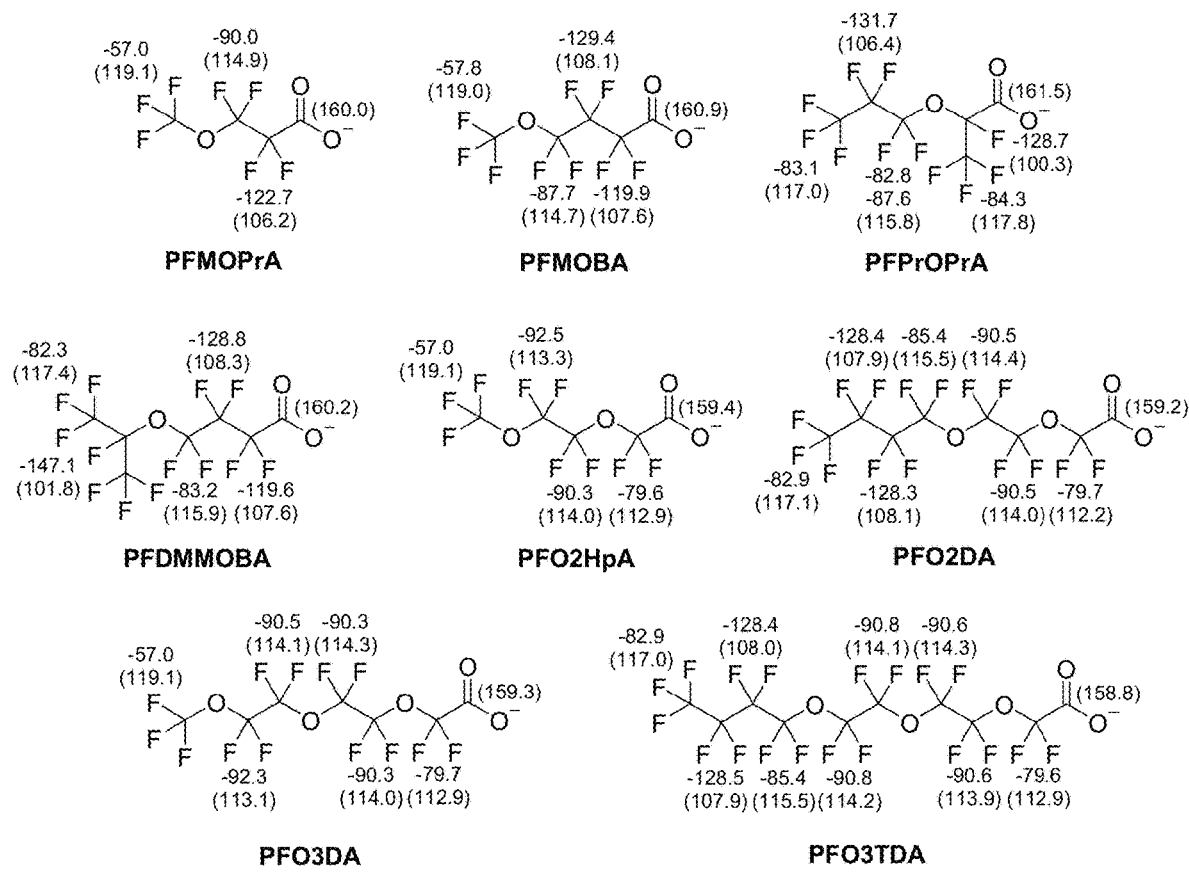
FIG. 3 shows structures and $^{19}F$ and $^{13}C$ NMR chemical shifts of eight PFECAs, where the $^{19}F$ NMR chemical shifts (in $D_2O$ referenced to hexafluorobenzene) are listed above the $^{13}C$ NMR chemical shifts (in $CDCl_3$ referenced to $CDCl_3$) in parentheses.

PFECAs can be short chain, with chain length<7 and long chain with chain length≥7. PFECAs with "high oxygen content" (HOC) and "low oxygen content" (LOC) refer to the ratio of oxygen atoms to chain length. An HOC PFECA is defined as an PFECA with a oxygen:chain length ratio of 0.5 or greater (including the carboxylate oxygens), and a LOC PFECA has an oxygen:chain length ratio less than 0.5. FIG. 3 shows eight PFCAs that have been examined with regard to their complexations with α-, β-, and γ-CDs. The association constants determined for individual fluorines were then averaged to find the average association constant for each PFECA with each CD. The results are shown in Table 3. The association β-CD of with the emerging PFASs, the PFECAs, is significantly less than that of the legacy PFASs, which lack the oxygen atoms, as indicated in Table 4.

TABLE 3

Average Association Constants of PFECAs with α-, β-, and γ-CDs

| PFAS (chain length), oxygen content | α-CD (M$^{-1}$) | β-CD (M$^{-1}$) | γ-CD (M$^{-1}$) |
|---|---|---|---|
| PFMOPrA (5), HOC | 2.60 +/− 1.14 × 10$^1$ | 1.54 +/− 0.52 × 10$^2$ | * |
| PFMOBA (6), HOC | 3.37 +/− 1.40 × 10$^1$ | 1.48 +/− 0.36 × 10$^3$ | * |
| PFPrOPrA (6), HOC | 2.36 +/− 1.10 × 10$^2$ | 7.45 +/− 4.27 × 10$^2$ | * |
| PFDMMOBA (7), LOC | * | 2.66 +/− 0.61 × 10$^4$ | 6.85 +/− 1.82 × 10$^2$ |
| PFO2HpA (7), HOC | 5.34 +/− 0.48 × 10$^1$ | 4.74 +/− 2.04 × 10$^2$ (1:1) 3.87 +/− 1.40 × 10$^2$ (2:1) | 8.43 +/− 3.24 × 10$^1$ |
| PFO2DA (10), LOC | * | 1.38 +/− 0.40 × 10$^4$ (1:1) 7.72 +/− 2.43 × 10$^3$ (2:1) | 1.39 +/− 0.38 × 10$^3$ |
| PFO3DA (10), HOC | 9.28 +/− 2.80 × 10$^1$ | 3.03 +/− 1.09 × 10$^3$ (1:1) 4.12 +/− 1.08 × 10$^3$ (2:1) | 7.60 +/− 2.10 × 10$^2$ |
| PFO3TDA (13), LOC | * | 5.93 +/− 1.20 × 10$^5$ (1:1) 1.36 +/− 0.28 × 10$^5$ (2:1) | 3.48 +/− 1.50 × 10$^3$ |

*no significant association.

TABLE 4

β-CD:PFECA Association Constants Compared with β-CD:Legacy PFASs

| chain length | Legacy PFAS | K$_{assoc}$ (M$^{-1}$) | Emerging PFAS | K$_{assoc}$ ((M$^{-1}$) | Decrease (1:1) |
|---|---|---|---|---|---|
| 5 | PFPA | 7.60 +/− 0.44 × 10$^2$ | PFMOPrA | 1.54 +/− 0.52 × 10$^2$ | <10 |
|  |  |  | PFMOBA | 1.48 +/− 0.36 × 10$^3$ | ~10 |
| 6 | PFHxA$^a$ | 2.35 +/− 0.46 × 10$^4$ | PFPrOPrA | 7.45 +/− 4.27 × 10$^2$ | ~100 |
|  |  |  | PFDMMOBA | 2.66 +/− 0.61 × 10$^4$ | ~10 |
| 7 | PFHpA | 4.30 +/− 0.85 × 10$^5$ (1:1) 2.30 +/− 0.27 × 10$^3$ (2:1) | PFO2HpA | 4.74 +/− 2.04 × 10$^2$ (1:1) 3.87 +/− 1.40 × 10$^2$ (2:1) | ~1000 |
| 10 | PFDA$^b$ | ~10$^5$ (1:1) ~10$^3$ (2:1) | PFO2DA | 1.38 +/− 0.40 × 10$^4$ (1:1) 7.72 +/− 2.43 × 10$^3$ (2:1) | ~10 |
|  |  |  | PFO3DA | 3.03 +/− 1.09 × 10$^3$ (1:1) 4.12 +/− 1.08 × 10$^3$ (2:1) | ~100 |

Legacy PFAS association constants from: $^a$Wilson and Verrall, Langmuir 1992, 14, 4710-7 and $^b$estimated based on association constants from PFOA and PFNA in Weiss-Errico and O'Shea, J. Hazardous Mat. 2017 329, 57-65

Based on the preliminary NMR study, embodiments of the invention include: the use of CDs and CD-based strategies for the removal of PFASs and PFECAs from water; the use of CD-based fluorescent sensors for the detection of low level concentrations of PFASs in water and other media; and the use of CDs for biological remediation of organisms contaminated with PFASs, including aquatic species, humans, or other organisms. Other embodiments of the invention are directed to therapeutic devices and methods for: decontamination of biological fluids, such as, but not limited to, blood; for mitigation or inhibition of biological activity, damage, or expression of PFASs; and protective agents and aids against exposure to PFASs.

The capacity or remediation in a human host as a therapeutic application is illustrated by the competitive binding between Human Serum Albumin (HSA) and β-CD for PFOA. Different spectroscopic techniques were employed to understand the interactions between HSA, PFOA, and β-CD. The association between PFOA and β-CD in the presence of HSA in water was characterized using $^{19}$F NMR experiments. Changes in the $^{19}$F chemical shift of PFOA titrated with β-CD were monitored to compare the host-guest association in the presence and absence of 35 μM HSA. The observed change in chemical shift of each fluorine peak varied differently as a function of β-CD concentration. The samples containing HSA showed broadened peaks, suggesting PFOA is binding to HSA. The 1:1 and 2:1 β-CD:PFOA association constants were calculated by nonlinear least-squares regression analysis for each fluorine. The association constants for fluorine atoms closer to the PFOA carboxylate head group with β-CD are weaker in the presence of HSA, whereas the fluorine atoms towards the end of the alkyl chain (tail) experience a stronger interaction with β-CD in the presence of HSA. The 1:1 and 2:1 β-CD:PFOA association constants averaged for all fluorine atoms are listed in Table 5. The 1:1 β-CD:PFOA association constant decreases in the presence of HSA likely due to the interaction of the carboxylate group of PFOA with HSA that weakens the PFOA association to β-CD. The association constants for the formation of 2:1 β-CD:PFOA complexes in the presence and absence of HSA are within the experimental error, suggesting that the formation of the 2:1 complex between β-CD and PFOA inhibits PFOA binding to HSA.

TABLE 5

Association constants for β-CD:PFOA in the presence and absence of HSA

| Condition | $K_{1:1}$, $M^{-1}$ | $K_{2:1}$, $M^{-1}$ |
|---|---|---|
| 50 mM Phosphate Buffer (pH 7.4) | $4.16 \pm 0.88 \times 10^5$ | $6.42 \pm 1.78 \times 10^2$ |
| 50 mM Phosphate Buffer (pH 7.4) with 35 µM HSA | $1.67 \pm 0.33 \times 10^5$ | $9.09 \pm 1.27 \times 10^2$ |

Figure 4:
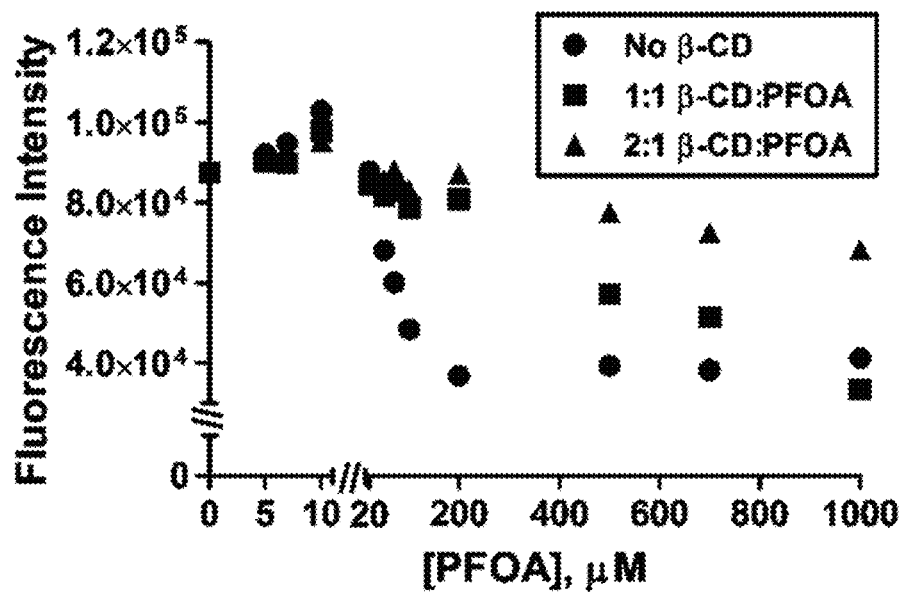
FIG. 4 is a plot of the fluorescence emission intensity measured at 335 nm of 10 human serum albumin (HSA) titrated with increasing concentrations of PFOA where for each PFOA concentration, β-CD was added to achieve 1:1 and 2:1 β-CD:PFOA ratios.

HSA titrations with PFOA carried out at 1:1 or 2:1 β-CD:PFOA ratios are shown in FIG. 4. The fluorescence intensities follow analogous trends as observed in the absence of β-CD, with an increase in emission intensity to the 1:1 PFOA:HSA ratio and subsequent quenching at elevated PFOA concentrations. The increase in the emission intensity observed for the 1:1 PFOA:HSA ratio is not dramatically affected by the presence of β-CD, whereas the emission intensity decrease at higher PFOA:HSA ratios is greatly reduced, and in case of the 2:1 β-CD:PFOA ratio, the emission intensity decreased much less than in the absence of β-CD. These results suggest that β-CD inhibits the binding of PFOA to HSA. The blue shift in the HSA emission spectra is less pronounced for the 1:1 β-CD:PFOA ratio, and absent for the 2:1 β-CD:PFOA ratio, indicating that β-CD is competing with HSA for PFOA and effectively prevents associating of PFOA molecules to lower affinity sites in the protein. The fluorescence intensity is increased when β-CD is added; however, the values do not return to the intensity values observed for HSA alone, suggesting that β-CD at the 1:1 and 2:1 ratio with PFOA cannot completely reverse the first PFOA binding to HSA.

Figure 5:
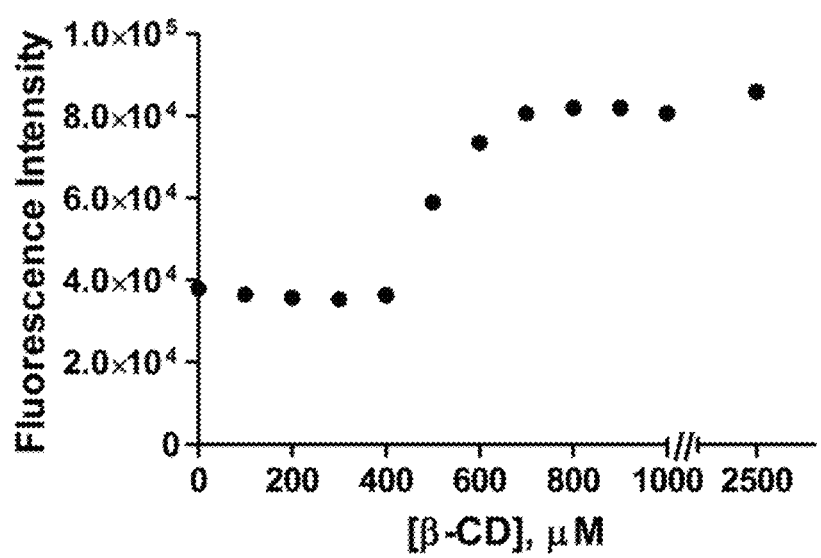
FIG. 5 is a plot of the fluorescence emission intensity measured at 335 nm for 10 μM HSA and 500 μM PFOA titrated with increasing concentrations of β-CD.

The reversal of the strong binding is possible. When 500 µM PFOA was added to 10 µM HSA (50:1 PFOA:HSA ratio), and β-CD was titrated into the sample, as shown in FIG. 5. As the β-CD concentration approached the 1:1 β-CD:PFOA ratio (500 µM), the fluorescence intensity and $\lambda_{max}$ dramatically increased and then experienced much smaller increases around the 2:1 ratio (1000 µM β-CD). At the 5:1 ratio (2500 µM β-CD), the fluorescence intensity and $\lambda_{max}$ return to the values observed for HSA in the absence of PFOA. These observations demonstrate that an equimolar concentration of β-CD to PFOA disrupts the weaker PFOA binding to HSA, and that a 5:1 molar ratio between β-CD and PFOA effectively disrupts PFOA molecules bound to the high affinity site. Hence, an excess of β-CD compared to PFOA can totally reverse PFOA binding to HSA.

Figure 6:
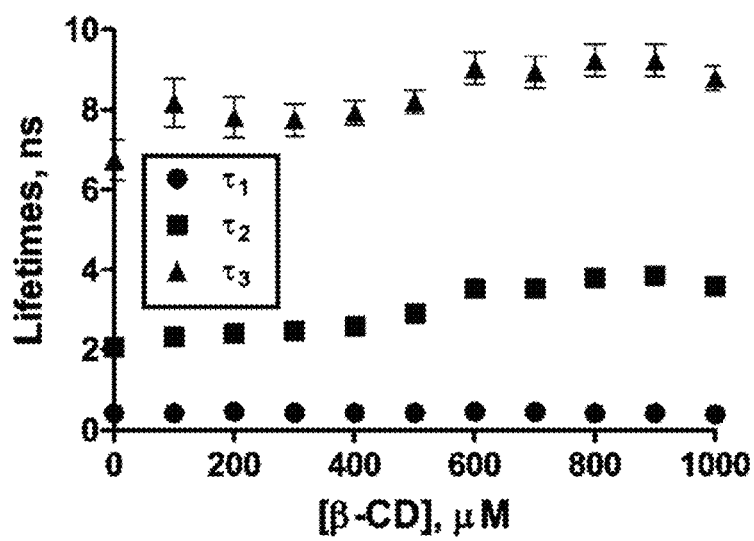
FIG. 6 shows a plot of the fluorescence lifetimes of 10 μM HSA and 500 μM PFOA titrated with increasing concentrations of β-CD.
Figure 7:
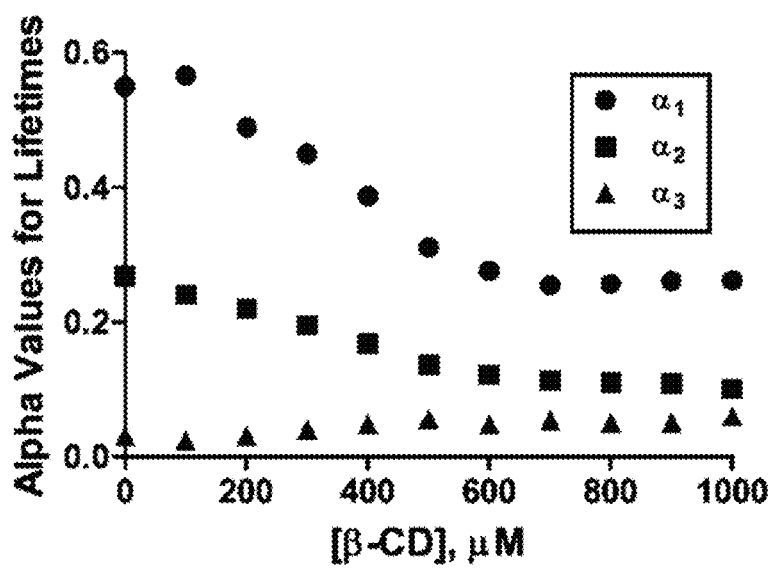
FIG. 7 shows a plot of α values for the fluorescence lifetimes of 10 μM HSA and 500 μM PFOA titrated with increasing concentrations of β-CD.

This conclusion is supported by fluorescence lifetime, $\tau_1$, $\tau_2$, and $\tau_3$ experiments. When β-CD is titrated into a sample of PFOA and HSA at a 50:1 PFOA:HSA ratio, $\tau_1$ does not change, and $\tau_2$ and $\tau_3$ increase, as shown in FIG. 6. The pre-exponential factors, $\alpha_1$ and $\alpha_2$ values, for the first and second lifetimes decrease, and the $\alpha_3$ value slightly increases, as indicated in FIG. 7, suggesting that β-CD prevents binding of PFOA to the low affinity sites. At the 5:1 β-CD:PFOA ratio, the observed T and a values decrease and are identical to those determined for HSA in the absence of PFOA. Again it is apparent that β-CD at low concentrations can disrupt the second binding of PFOA to HSA, and that excess β-CD can totally reverse all PFOA binding to HSA.

To assess the potential of β-CD to attenuate the developmental and lethal effects of PFOA, zebrafish (*Danio rerio*) embryo are used as a toxicological model. Practical advantages of the zebrafish embryo system include ease of rearing and a high fecundity, as well as small (~1 mm) and nearly transparent embryos, rapid (≤5-7 day) embryo development, and a fully sequenced genome. As such, the zebrafish embryo has been employed to look at a wide range of environmental contaminants in terms of acute and chronic toxicity. Acute toxicological endpoints (e.g., embryotoxicity, teratogenicity, neurotoxicity) which are readily accessible in the zebrafish embryo model are, furthermore, aligned with the reported health concerns associated with PFOA, and the system has, indeed, been used to evaluate toxicity of PFOA and related perfluorinated alkyl substances.

Figure 8:
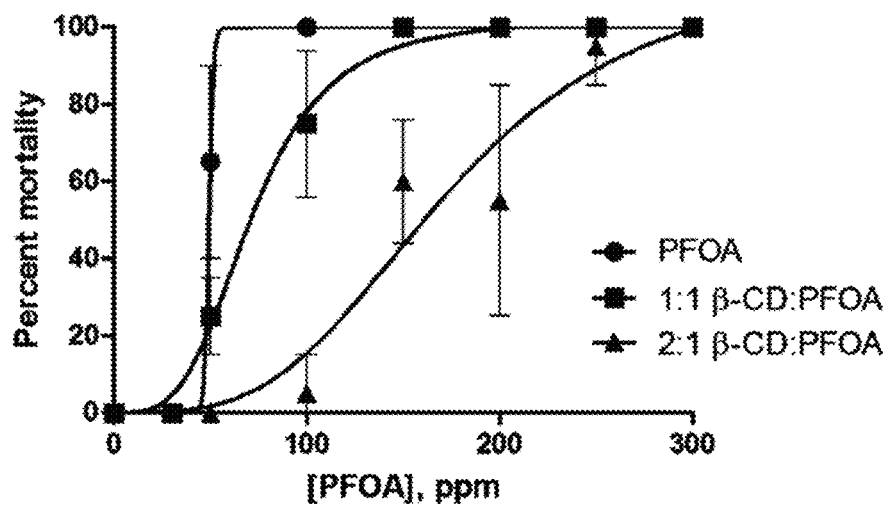
FIG. 8 shows plots of the concentration dependent toxicity of PFOA, and 1:1 and 2:1 β-CD: PFOA treatments, in terms of rapid onset lethality as percent mortality at 24 hours past fertilization (hpf) (error bars represent±one standard deviation, n=4).
Figure 9:
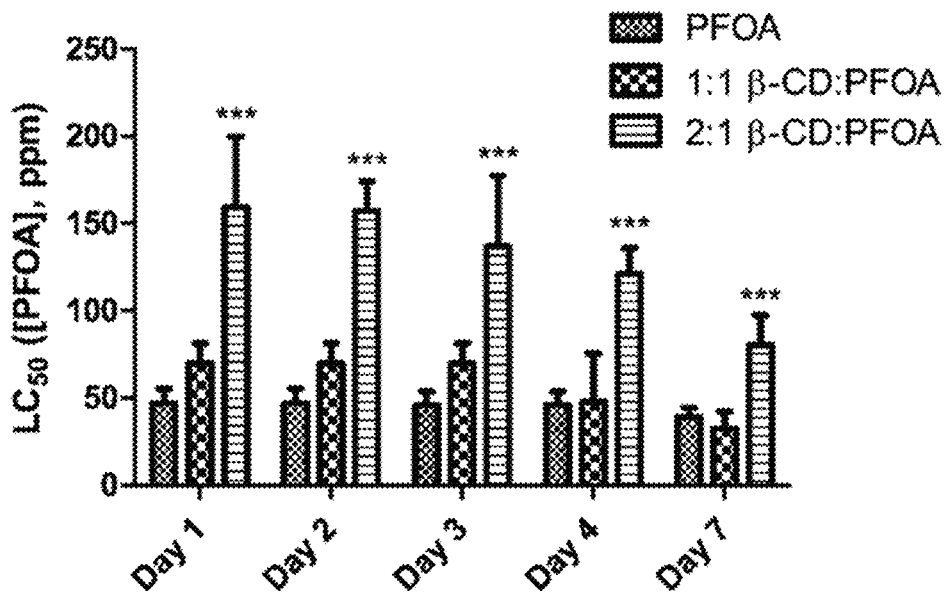
FIG. 9 is a bar chart of $LC_{50}$ values for PFOA only, 1:1 β-CD:PFOA, and 2:1 β-CD:PFOA over 7 days past fertilization (dpf) where 2:1 β-CD:PFOA $LC_{50}$ values are significantly different (***=p<0.0001) than PFOA only, and 1:1 β-CD:PFOA, where error bars represent 95% confidence intervals.

A rapid onset of embryotoxicity was observed for PFOA with mortality, characterized by coagulation of embryos, occurring within a few hours of exposure. As shown in FIG. 8, by 24 hours past fertilization (hpf), a significant dose-dependent response with respect to lethality was observed with all embryos dead at PFOA concentrations above 100 ppm. The observed dose response, with respect to mortality, remained largely unchanged, and the calculated $LC_{50}$ values did not significantly change over the course of the exposure, 7 days past fertilization (dpf), as shown in FIG. 9. Notably, aside from a higher number of mortalities, no clear pattern of developmental deformities was observed: by 7 dpf, for example, only ~5% of both control and PFOA-treated embryos showed any discernible deformities which included bent spines and edemas. Similarly, the hatching rates were unaffected with the majority of surviving embryos, in both control and PFOA treatments, hatched by 3 dpf.

Figure 10:
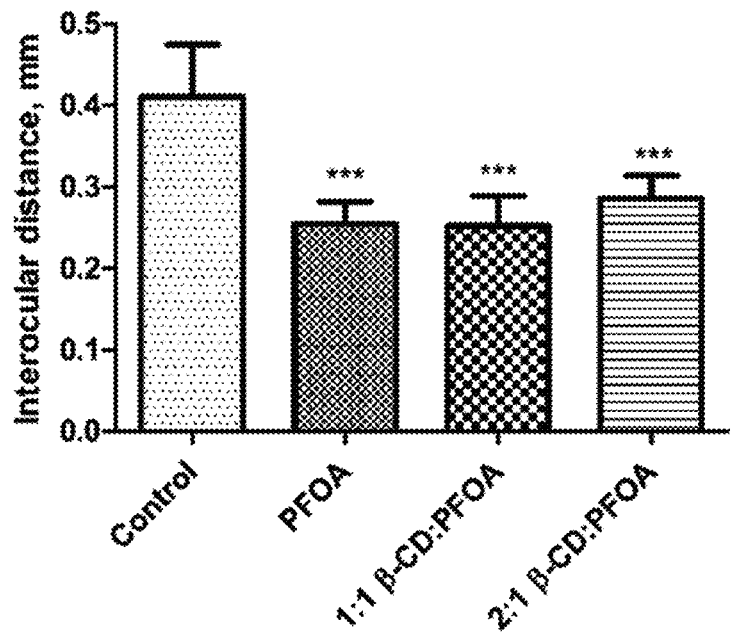
FIG. 10 is a bar chart of the interocular distance, as a morphometric measure of embryo body size, for untreated embryos ("Control") compared to surviving embryos in sub-lethal concentrations (≤50 ppm) of PFOA only, and 1:1 and 2:1 β-CD:PFOA treatments, at 7 dpf, where all three treatments are significantly different (***=p<0.0001) than controls and error bars represent 95% confidence intervals.
Figure 11:
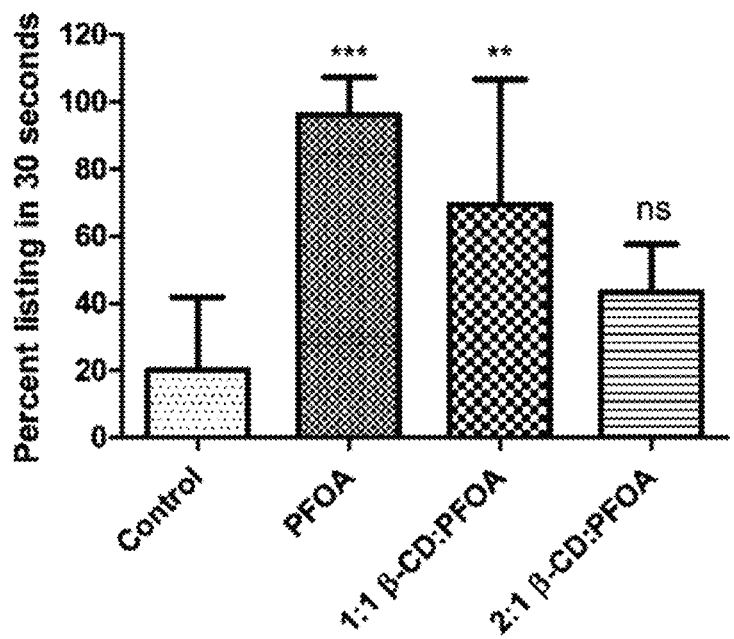
FIG. 11 is a bar chart of the percent listing after 30 seconds for the untreated embryos ("Control") compared to surviving embryos in sub-lethal concentrations (≤50 ppm) of PFOA only, and 1:1 and 2:1 β-CD:PFOA treatments, at 7 dpf, where the control values are significantly different from PFOA only (*=p<0.0001) and 1:1 β-CD:PFOA (=p<0.01) and where error bars represent 95% confidence intervals.

Apparent inhibition of embryo growth (i.e., reduced body size), however, was observed, with the surviving PFOA-treated embryos being smaller at the end of the exposure compared to controls. Inhibition of development was specifically evaluated morphometrically based on interocular distance at 7 dpf: significantly (p<0.0001) reduced interocular distances were measured for surviving PFOA-treated embryos at sub-lethal concentrations, ≤50 ppm, pooled; 0.25±0.06 mm, versus untreated control 0.41±0.14 mm embryos, as shown in FIG. 10. In terms of other relevant endpoints, apparent neurobehavioral effects were observed for surviving embryos, and specifically a high frequency of listing was observed for PFOA-treated embryos. At low PFOA concentrations below the $LC_{50}$ (i.e., ≤50 ppm, pooled), the percent of surviving embryos observed to list within a 30 second period (96±9%) was significantly higher (p-<0.0001) than controls without PFOA (20±13%) as shown in FIG. 11.

$LC_{50}$ values for each treatment of β-CD with PFOA alone, 1:1 and 2:1 β-CD:PFOA ratios were calculated and compared. At 1 dpf, a significantly (ANOVA, p<0.0001) higher $LC_{50}$ was observed for 2:1 β-CD:PFOA (159.3±22.9 ppm) compared to both PFOA alone (47.3±3.6 ppm), and the 1:1 β-CD:PFOA treatment (69.9±5.7 ppm). The lethal concentration for 1:1 β-CD:PFOA was higher than PFOA alone, but the difference was not statistically significant. However, whereas $LC_{50}$ did not change over time for PFOA alone, calculated values for both 1:1 and 2:1 β-CD:PFOA treatments notably decreased over 7 days of exposure, as is indicated in FIG. 9, due to additional, post-hatch mortalities. By 4 dpf, the 1:1 β-CD:PFOA $LC_{50}$ (48.1±14.2 ppm) was essentially equal to the PFOA alone. Although $LC_{50}$ for 2:1 β-CD:PFOA treatment decreased (e.g., 80.5±9.3 pm by 7 dpf), it was still significantly (p<0.0001) higher than either PFOA alone, or PFOA in a 1:1 ratio with β-CD. No discernible toxicity was observed for β-CD alone, within the range of tested concentrations, including the maximum concentration (i.e., 1645 ppm, or 1.45 mM, β-CD) evaluated in the 2:1 ratio treatments.

In contrast to lethality, β-CD did not reduce apparent developmental toxicity in terms of a morphometric variable, i.e., interocular distance, as indicated in FIG. 10. Comparing surviving embryos at, or below, the $LC_{50}$ (i.e., ≤50 ppm), the measure of interocular distance for 7 dpf embryos was significantly (p<0.0001) lower in both 1:1 β-CD:PFOA (0.25±0.07 mm) and 2:1 β-CD:PFOA (0.29±0.07 mm) treatments when compared to controls, and nearly identical to PFOA alone. Similar to lethality, the apparent neurobehavioral effect (i.e., listing) among 7 dpf embryos was reduced among surviving embryos at sub-lethal concentrations (i.e., ≤50 ppm) in the 2:1 β-CD:PFOA treatment: percent listing in this treatment was not significantly different from untreated controls, as indicated in FIG. 11. Frequency of listing in the 1:1 treatment was decreased, compared to that of PFOA alone, but it was still significantly higher (p<0.01) than untreated controls.

Hence, β-CD, particularly in excess molar ratios, can largely attenuate the toxicity of PFOA in solution as evidenced by reduced toxicity in the zebrafish embryo model. The ratio of β-CD to PFOA, rather than the concentration of β-CD, drives this attenuation. It suggests that the host-guest complex may exhibit less biological activity, or alter bioavailability, compared to PFOA alone. Alternatively, β-CD may simply reduce, by way of the variable formation of 1:1 and 2:1 complexes, levels of free (and thus toxic) PFOA in solution in a concentration-dependent manner.

In an embodiment of the invention, enhanced removal of PFOA is achieved when β-CD is used in tandem with a vehicle additive: for example, but not limited to, powdered activated carbon (PAC). A mixture of β-CD in the vehicle PAC allowed 100% removal of PFOA from an aqueous solution in a period of about five minutes. PFASs do not adsorb well to activated carbon in environmentally relevant samples. However, β-CD can much more easily adsorb to activated carbon in these samples. From the previous NMR study, the β-CD:PFAS complex is not disturbed in the presence of humic acid or at different ionic strengths and solution pH. Thus, the β-CD:PFAS can form in the sample, and be adsorbed to the vehicle additive, such as activated carbon, for enhanced removal of PFASs. The vehicle additive can be a fine powder, large particulate matter, a porous rubber, a porous ceramic, or any other high surface area solid. The activated carbon β-CD mixture can be employed in a delivery device to deliver the β-CD to the PFAS contaminated environment or to deliver a fluid environment to the vehicle additive containing the PFASs. The delivery device can be a column or other container packed with the β-CD/vehicle additive mixture, where an active or passive means of flowing the water through a bed of the mixture is employed, such as within porous bags (for example woven bags) that allow the PFAS adsorbing mixture to be placed in an aqueous environment and retrieved after a period of soaking in the PFAS contaminated environment, or on or within the surface of a rigid or flexible sheet that can be placed in an aqueous environment.

In another embodiment of the invention, the β-CD is modified to have an amine group situated on a single primary or secondary carbon of the β-CD (replacing a hydroxyl group), employing one or more of the methods taught in: Brady et al., *Org. Synth.* 2000, 77, 220; Murakami et al., *Tetrahedron Lett.* 1987, 28, 321-4; Muderawan et al., *Tetrahedron Lett.* 2005, 46, 7905-7; Hocquelet et al., *Tetrahedron* 2006, 62, 11963-71; and Teranishi et al., *Bioscience, Biotechnology, and Biochemistry* 1998, 62:6, 1249-52. In this manner, when the aqueous environment is less than pH seven, an ammonium ion will form for ion pairing with the carboxylate or sulfonate of the PFAS, which can further enhance the $K_{1:1}$ and/or $K_{2:1}$ constants for association of the PFAS to the β-CD. After absorption of the PFAS and removal from the environment, the complexes can be placed in a sufficiently basic solution to promote dissociation of the protonated PFAS from the complex and recovery of the PFAS for destruction, modification, or reuse in a productive manner.

In another embodiment of the invention, the β-CD can be complexed to a fluorophore that is tethered to the β-CD. Such fluorophores complex poorly to the β-CD relative to the formation of the host-guest complex with the PFASs. The CD is a fluorescence enhancer to the complexed fluorophore in an aqueous environment. The presence and even the quantity of PFASs can be determined by fluorescence spectroscopy from the irradiated solution due to the decreased fluorescence of the displaced fluorophore. Fluorophores include, but are not limited to: naphthalene, anthracene, phenanthrene, and dansyl-leucine.

In another embodiment of the invention, the remediation of PFASs from an organism is performed by the introduction of the β-CD or a modified β-CD with an appropriate vehicle and in an appropriate delivery package. In this manner, an organism or an environment in which an organism resides can have a smaller portion of the PFASs. The organism can be any plant or animal, including aquatic life, mammals, and even humans.

MATERIALS AND METHODS

Characterization of PFECA-CD Complexation
Materials

Perfluoro(3-oxabutanoic) acid (PFMOPrA), perfluoro(4-oxapentanoic) acid (PFMOBA), perfluoro(5-oxa-6-dimethylhexanoic) acid (PFDMMOBA), perfluoro(3,6-dioxheptanoic) acid (PFO2HpA), perfluoro(3,6-dioxadecanoic) acid (PFO2DA), perfluoro(3,6,9-trioxadecanoic) acid (PFO3DA), and perfluoro-(3,6,9-trioxatridecanoic) acid (PFO3TDA) were purchased from SynQuest Laboratories. Perfluoro(2-methyl-3-oxahexanoic) acid (PFPrOPrA, "GenX") was purchased from Alfa Aesar. Hexafluorobenzene was purchased from Sigma-Aldrich. α-, β-, and γ-Cyclodextrins were purchased from Acros Organics. Deuterium oxide (99.9% D) was purchased from Sigma-Aldrich and stored at 4° C. Sodium deuteroxide (99.5% D, 30% in $D_2O$) was purchased from Cambridge Isotope Laboratories. All chemicals were used without further purification.

Sample Preparation

For the titration experiments, samples were prepared as previously described.19 The concentration of each PFECA was 2.42×10−3 M, except for PFO3TDA which had a concentration of 6.05×10−4 M due to possible micelle formation at higher concentrations. The solution consisted of 50% $D_2O$ and 50% DI H2O, adjusted to pH 7 with 0.036 M NaOH. Hexafluorobenzene (1.44×10−3 M) was added as an internal standard (control experiments established that hexafluorobenzene does not significantly interact with cyclodextrins). Each cyclodextrin (α-, β-, γ-) was added at various stoichiometric ratios and the solution was sonicated until dissolution of the CD was achieved. For the $^{19}F$-$^{13}C$ gHMBC experiments, 18 μL of each PFECA was dissolved in 700 μL of $CDCl_3$. For the $^{19}F$-$^1H$ HOESY experiments, samples were prepared of 0.100 M β-CD in $D_2O$ with NaOD added to aid dissolution. Either PFDMMOBA or PFPrOPrA (0.100 or 0.050 M) was added to make the 1:1 and 2:1 β-CD:PFECA ratios.

$^{19}F$ and $^{13}C$ NMR Spectroscopy $^{19}F$ NMR spectroscopy was performed with a 400 MHz Bruker instrument with a quad probe (operating at 376.498 MHz for 19F). Hexafluorobenzene was used as the internal standard with a chemical shift of −164.9 ppm. For the titration experiments, the chemical shift of each peak was recorded, and the 1:1 and 2:1 association constants were calculated in GraphPad Prism and Mathworks Matlab by Ramos Cabrer et al.'s, *Langmuir* 1999, 15, 5489-5495 method.

$^{19}$F-$^{13}$C gradient Heteronuclear Multiple Bond Coherence (gHMBC) NMR spectroscopy was performed on a 500 MHz Varian Inova spectrometer equipped with a 3 r.f. channel console. 1D 13C NMR spectra of PFASSs would require application of 19F decoupling over a large frequency band (about 70 ppm, or 33 kHz). Instead, the 13C NMR chemical shifts were obtained using 2D $^{19}$F-$^{13}$C gHMBC experiments as an indirect method, which require less decoupling as well as providing a 27-fold increase in signal-to-noise compared to conventional $^{13C}$NMR spectra. $^{19}$F-$^{13}$C gHMBC spectra were recorded in less than an hour. The $^{19}$F spectra were run on a spectral window from 40 to 140 ppm, in 4 transients, with a 90° pulse (5.3 μs), a relaxation delay of 1 s and an acquisition time of 3 s. The gHMBC spectrum was run on a minimal spectral window in f 2 in 8 k points. The spectral window in f1 was from 90 to 170 ppm, and 256 increments were used, each in 4 transients and with a relaxation delay of 1 s. The FIDs were weighted in f 2 with a Gaussian function of 0.1 s shifted 0.08 s and in f1 with a Gaussian of 0.1 s. The polarization transfer delay was 16.7 ms, corresponding to a coupling constant of 30 Hz, which yielded cross-peaks for couplings over one bond (easily identified by their splitting of ~280 Hz) and couplings over two bonds.

$^{19}$F-1H HOESY NMR Spectroscopy

The NMR spectra for the HOESY experiments were run on a Varian Inova spectrometer, operating at 500 MHz for $^{1}$H, equipped with a 3 r.f. channel console, at 25° C. The probe was a 5 mm probe with two channels, $^{1}$H and $^{19}$F, connected to channels 1 and 3 in the console, correspondingly. $^{1}$H and $^{19}$F chemical shifts were referenced on the TMS and CFCl$_3$ scales. The $^{1}$H NMR spectra were run on a spectral window from −0.5 to 9.5 ppm, in 1 transient, with a 90° pulse (19 μs), a relaxation delay of 1 s and an acquisition time of 3.2 s. The $^{19}$F spectra were run on a spectral window from −60 to −170 ppm, in 16 transients, with a 90° pulse (12 μs), a relaxation delay of 1 s and an acquisition time of 0.63 s. The HOESY spectrum was run with observation of $^{19}$F and a mixing time of 50 ms for PFDMMOBA and 100 ms for PFPrOPrA, on a spectral window from −170 to −60 ppm and 16 k points in f2. The spectral window in f1 was from 3 to 5 ppm for PFDM-MOBA and 3 to 4 ppm for PFPrOPrA, and 128 increments were used, with a total experiment time of 20 h for the 2:1 ratios and 5 h for the 1:1 ratios.

Assignment of the PFECA $^{19}$F NMR Spectra

Assignments of individual fluorine peaks of eight PFECAs, as shown in FIG. 3, were based on chemical shift, splitting pattern, integration, peak broadening, and by comparison with $^{19}$F NMR spectra of legacy PFASs. Assignments were confirmed by the $^{19}$F-13C gHMBC experiments. $^{19}$F and $^{13}$C NMR chemical shifts are displayed in FIG. 3. Seven general types of fluorine peaks were observed and assigned to specific structures, with consistent chemical shifts regardless of chain length and number of oxygens, as shown in Table 6. The fluorine peaks shifted more downfield when adjacent to an oxygen atom and more upfield when surrounded by fluoromethylene subunits. Downfield chemical shifts are correlated to decreased shielding, whereas upfield chemical shifts are correlated to increased shielding. The presence of the ether oxygen leads to deshielding of the adjacent fluorines, causing their chemical shift to be shifted downfield compared to what is expected from a legacy PFAS. Through-space coupling, instead of through-bond coupling, is characteristic for saturated perfluorinated molecules. Fluorines that are four bonds apart are closer in space than fluorines three bonds apart in PFAS structures (refer to the structures included in FIG. 3). Thus, in general, four bond coupling constants were observed ($^{4}J_{F-F}$≈8-11 Hz), but not three bond coupling constants ($^{3}J_{F-F}$≈0-3 Hz). HOC PFECAs generally had sharper peaks and a more defined splitting pattern than LOC PFECAs due to the oxygen linkages extending the distance between fluorine atoms, and thus decreasing the amount and strength of coupling interactions along the fluorinated backbone. Peak broadening was observed for longer chain PFECAs, especially LOC PFECAs, in the middle of the chain, due to the complex splitting pattern arising from the number and variety of other fluorines within coupling proximity.

TABLE 6

Chemical Shifts of PFECA $^{19}$F NMR Peaks$^a$

| Structure (peak in bold) | chemical shift, ppm |
| --- | --- |
| —OOC—CF$_2$—O— | −79 |
| —OOC—CF$_2$—CF$_2$— | −119 to −122 |
| —O—CF$_2$—CF$_2$—O— | −90 to −92 |
| —O—CF$_2$—CF$_2$—CF$_2$— | −83 to −87 |
| —O—CF$_2$—CF$_2$—CF$_2$ | −128 to −129 |
| —CF$_2$—O—CF$_3$ | −57 |
| —CF$_2$—CF$_2$—CF$_3$ | −82 to −83 |

$^a$Referenced to hexafluorobenzene (−164.9 ppm).

Association Constants of PFECAs with α-, β-, and γ-Cyclodextrin.

The $^{19}$F NMR spectrum of each PFECA was monitored as a function of CD concentration. The individual CD:PFECA association constants were determined via nonlinear least-squares regression analysis of the change in observed chemical shift. The association constants determined for individual fluorines were then averaged to find the average association constant for each PFECA with each CD. The results are shown in Table 3.

The CD association constants for PFECAs did not have a direct relationship with chain length as observed with legacy PFASs. Instead, the magnitude of association appears to depend on a number of factors, including oxygen content and branching. For α-CD, weak association constants are observed for the short chain PFECAs (chain length<7). For long chain PFECAs (chain length≥7), HOC PFO2HpA and PFO3DA show association with α-CD at the terminal —CF$_2$OCF$_3$ group, whereas the long chain LOC PFECAs, with a continuous chain of perfluorinated carbons at the tail, exhibited no significant association with α-CD. The cross-sectional area of the α-CD cavity cannot fit the PFAS chain (cross-section of 18.9 Å$^2$ for α-CD cavity and 28.3 Å$^2$ for PFASs), leading to the weak or nonexistent complexation (on the order of 10$^1$-10$^2$ M$^{-1}$) with the studied PFECAs that may be due to association besides host-guest (i.e., aggregate formation). For γ-CD, moderate association constants (on the order of 10$^2$-10$^3$ M−1) were observed for the long chain PFECAs. LOC PFECAs had stronger association with γ-CD when compared to HOC PFECAs of the same chain length (for example, PFO2DA vs PFO3DA). The cross-section size of γ-CD (49.0 Å$^2$) is larger than necessary to accommodate PFASs, resulting in weaker hostguest interactions. Since —CF$_2$— groups have a larger van der Waals radius than oxygen, the PFECAs with more fluorinated carbons (LOC) will have more favorable interactions with the γ-CD cavity than HOC PFECAs. Short chain PFECAs are too small in comparison to the γ-CD cavity to exhibit attractive molecular interactions leading to relatively insignificant host-guest interactions observed.

β-CD exhibited the strongest interactions with all studied PFECAs. Stronger association constants were observed for longer chain PFECAs and LOC PFECAs when compared with shorter chain PFECAs and HOC PFECAs, respectively. β-CD has the ideal cavity cross-section (30.2 Å$^2$) to accommodate linear perfluorinated carbon chains as guests, resulting in strong van der Waals interactions between the fluorinated chain and β-CD cavity. Oxygen, which has a smaller van der Waals radius than —CF2-, does not fit tightly within the β-CD cavity, thus weakening the interactions promoting complexation between the PFECA and β-CD. The 1:1 β-CD:PFECA association constants are affected by chain length and oxygen content. Long chain PFECAs (except PFDMMOBA) also form stable 2:1 β-CD:PFECA complexes, like those described for legacy PFASs. The 2:1 β-CD:PFECA association constants increase with chain length with the strongest association observed for the longest chain PFECA (PFO3TDA). This result suggests that chain length is the most important factor in determining the strength of the 2:1 CD:PFAS complex.

The β-CD:PFECA and β-CD:legacy perfluorocarboxylic acid association constants are compared in Table 4. The comparison was made between compounds with the same chain length, defined as the longest continuous chain of atoms from the headgroup, not number of carbons. The PFECAs have weaker complexation with β-CD than the corresponding legacy PFAS (including perfluoropentanoic acid, PFPA; perfluorohexanoic acid, PFHxA; perfluoroheptanoic acid, PFHpA; and perfluorodecanoic acid, PFDA) of the same chain length. Generally, for each ether oxygen substituted for carbon in the PFAS chain, the association constant decreased by an order of magnitude. These results demonstrate that ether functionalities have weaker complexation with β-CD than the fluorinated carbon chain, and thus weaken the overall association. The interior of the cyclodextrin cavity is hydrophobic, and thus strongly associates with the hydrophobic fluorinated chain while having weak or nonexistent interactions with the smaller, more polar oxygens in the ether functionalities. LOC PFECAs not only have fewer ether oxygens per chain length, but also have longer sections of a continuous fluorinated carbon chain, facilitating strong association of β-CD with the fluorine-rich section of the chain.

The effects of branching on the association constants were investigated in more detail with two branched monoethers, PFPrOPrA and PFDMMOBA. Both have segments of three fluorinated carbons, which should lead to favorable CD encapsulation. For PFPrOPrA, branching occurs adjacent to the carboxylate headgroup, whereas for PFDMMOBA, branching occurs after the ether near the tail (forming a fluorinated isopropyl group tail). β-CD displays much stronger complexation (~40×) with PFDMMOBA than PFPrOPrA. The position of branching has a dramatic effect on the strength of β-CD encapsulation, with branching near the tail leading to stronger hostguest complexation than branching near the head.

This result can be explained when taking into account the association constant of β-CD with linear PFMOBA. PFMOBA, with K=1.48×10$^3$ M$^{-1}$, has a —CF2CF2CF2- segment attached to the carboxylate group and a perfluoromethyl ether as the tail section, an analogous structure to PFDMMOBA. In comparison, PFPrOPrA has an association constant of 7.45×10$^2$ M$^{-1}$, and PFDMMOBA has an association constant of 2.66×10$^4$ M$^{-1}$, with β-CD. All three compounds contain a —CF2CF2CF2- segment, and they are pictured in FIG. 3 along with their 1:1 β-CD:PFECA association constants. From our previous work we have found that β-CD has a strong preference for association with the —CF$_2$CF$_2$CF$_2$— segment, due to van der Waals interactions between the guest molecule and host cavity, and the molecular sizes of the PFASs and β-CD. The measured association constants of the three ether compounds, however, indicate that other factors are also important in the host-guest interactions.

One major difference between these three compounds is the presence and placement of branched structures. The trifluoromethyl group (—CF$_3$) has an effective size between that of a hydrogenated isopropyl and tert-butyl group; thus, a fluorinated isopropyl group would be larger than a hydrogenated tert-butyl group (approximately the size of —CBr$_3$). Since the linear PFAS has a virtually perfect fit with the β-CD cavity, and the effective sizes of fluorinated functional groups are larger than their hydrocarbon counterparts, branching renders fluorocarbons too large to fit within the cavity. With this in mind, β-CD can only encapsulate the linear perfluorinated carbon chains and cannot accommodate the branched portion of the PFAS within the β-CD cavity. β-CD can thread over the tail, but not the branched head, of PFPrOPrA; the tail or the head of PFMOBA; and the head, but not the branched tail, of PFDMMOBA. In addition to the effect of branching on encapsulation within the CD cavity, branching can also influence hydrogen-bonding between the host and guest. The carboxylate of linear perfluorocarboxylic acids, similar to other guest molecules containing a carboxylate, can hydrogen-bond to the hydroxyl groups lining the perimeter of the β-CD cavity. The β-CD hydroxyls can be within a favorable distance for hydrogenbonding to the carboxylate of both PFMOBA and PFDMMOBA, as the —CF$_2$CF$_2$CF$_2$— segment that the CD will encapsulate is next to the carboxylate group. The branched portion of PFPrOPrA, however, prevents β-CD from moving along the fluorinated chain to be close enough to interact with the carboxylate headgroup. In contrast, the branched portion of PFDMMOBA prevents β-CD from sliding toward the tail end of the fluorinated chain, keeping the CD close enough to hydrogen-bond with the carboxylate. PFMOBA had no branching, and so although it can hydrogen-bond with β-CD, β-CD can still freely move along the PFMOBA chain, decreasing the chances of the hydrogen-bonding interactions.

The association constant of PFMOBA is greater than PFPrOPrA due to hydrogen-bonding, and the association constant of PFDMMOBA is greater than PFMOBA due to hindered movement of the CD along the tail end of chain. From these results it appears that the strength of CD:PFAS interactions is determined not only by hydrophobic interactions between the fluorinated chain and CD cavity, but also by hydrogen-bonding between the PFAS carboxylate and the hydroxyl groups along the CD perimeter. Branching close to the polar headgroup inhibits this hydrogen-bonding, while branching at the tail enhances association by stabilizing the complex. These results suggest that it is favorable for the carboxylate to thread through the CD cavity (as would be necessary in the case of PFDMMOBA), even though this would cause the hydrophilic and anionic carboxylate to be in close proximity to the hydrophobic CD cavity and removed from the bulk aqueous solution. Previous studies of carboxylate-CD interactions, however, support our conclusions, by providing evidence of carboxylate inclusion in the CD cavity. For example, α,ω-alkyl dicarboxylates have similar association constants with α-CD as their corresponding monocarboxylates, suggesting that other factors, such as van der Waals interactions between the CD cavity and hydrophobic chain (either hydrogenated or fluorinated), are more important than the inclusion or threading of the hydrophilic moiety in or through the CD cavity for favorable hostguest complexation. The measured association constants of the PFECAs suggest that the carboxylate threading through the CD cavity has little effect on the hostguest complexation (as evidenced by the strong association between β-CD and PFDMMOBA, where this threading is required for inclusion). Instead, van der Waals interactions, hydrogen-bonding, and physical structure (branching vs linear) of the PFECA are critical factors for strong encapsulation.

Structural Characterization of the CD:PFAS Complex

Figure 12:
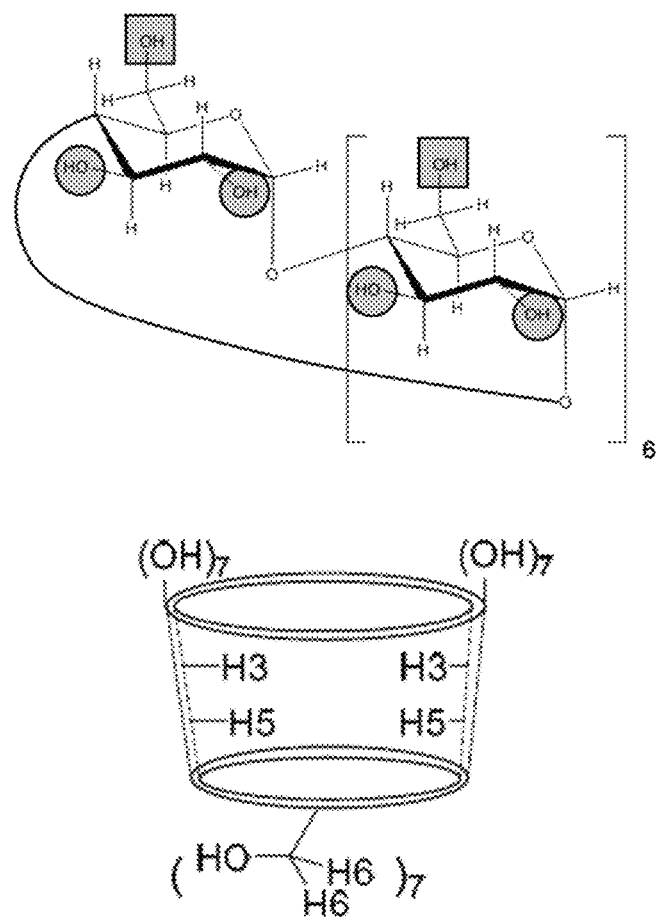
FIG. 12 shows the structure of β-cyclodextrin as a glucose repeating unit with labeled protons, the primary hydroxyl groups (squares) and secondary hydroxyl groups (circles), and as a side view toroid structure where the interior protons (H3 and H5), the secondary hydroxyl groups on the large end, and the primary hydroxyl groups (next to H6) on the small end.

To further probe the structural details of the β-CD:PFECA complexes, and PFASs in general, $^{19}F$-$^1H$ heteronuclear Overhauser effect spectroscopy (HOESY) NMR experiments were conducted. In HORSY NMR experiments, throughspace nuclear Overhauser effects (NOEs) are observed between different nuclei. HOESY signals are observed as a function of the distance between the nuclear spins of the fluorines on the PFAS (guest) and the protons on the CD (host). The intensity of the HOESY signal increases nonlinearly with decreasing distance ($1/r^6$) between individual fluorines and protons. $^{19}F$-$^1H$ HOESY experiments were conducted on the β-CD:PFECA mixtures to determine the relative positon of fluorine atoms on the PFECA guest to the protons on the β-CD host. The structure of β-CD is shown in FIG. 12. H1, H2, and H4 extend to the outside of the CD, whereas H3 and H5 point toward the interior of the CD cavity. H6 are the methylene protons attached to the primary hydroxyl groups lining the smaller opening of the CD. Thus, NOEs between interior protons H3 and H5 and the perimeter protons H6 with the fluorines on the PFECA backbone contained within the CD interior are expected to be observed for the hostguest inclusion complex. The exterior protons (H1, H2, and H4) are not expected to exhibit any NOE with the PFECA fluorines. Furthermore, cyclodextrins are not cylinders, but truncated cones, having a smaller end and a larger end. The smaller side, as shown in FIG. 12, is lined with seven primary hydroxyl groups and the larger side is lined with 14 secondary hydroxyl groups. H6 and H5 are closer to the smaller opening and H3 is closer to the larger opening. Thus, the orientation of the CD in the host-guest complex can be elucidated from the HOESY signals or crosspeaks of the fluorines along the backbone with H3, H5, and H6. The specific orientation of the CD relative to the head and tail of PFASs in solution has previously not been confirmed. The $^{19}F$-$^1H$ HOESY spectra of both 1:1 and 2:1 β-CD:PFECA ratios of PFDMMOBA and PFPrOPrA were analyzed.

Figure 13:
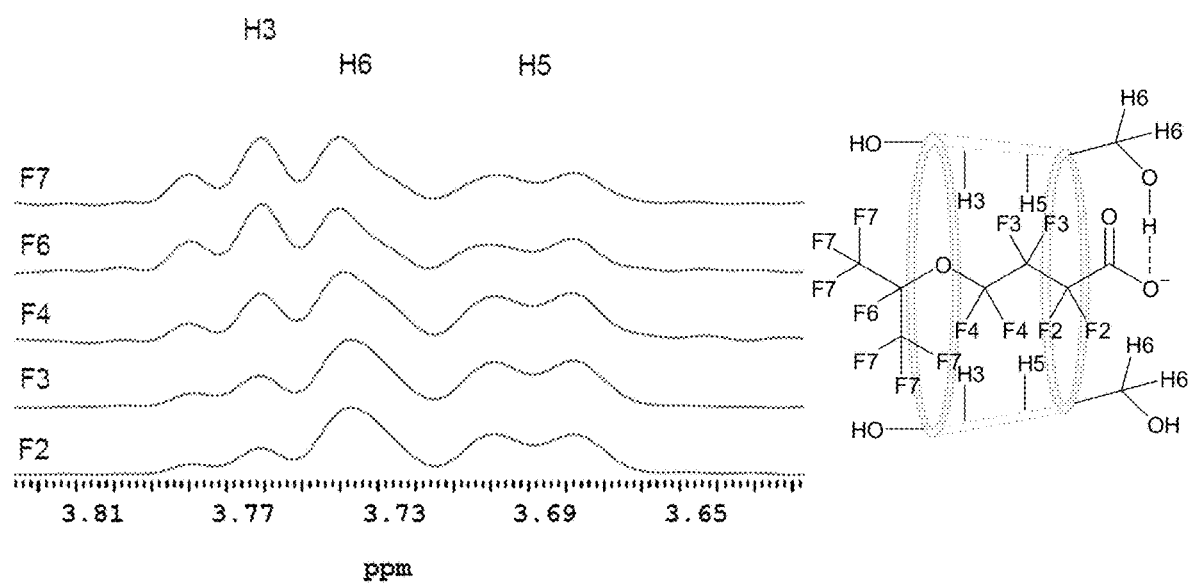
FIG. 13 shows a $^{19}F$-$^{1}H$ HOESY of β-CD:PFDMMOBA complex where the proton slices for each fluorine peak are shown with the host-guest structure is elucidated from the NOEs observed between each fluorine and proton. H3 is a triplet; H5 is a doublet; H6 is a broad singlet.

The HORSY results are visualized by the proton slices across f1 at the f2 frequencies of the fluorine signals. For the β-CD:PFDMMOBA complex, all fluorines display crosspeaks with H3, H5, and H6 of the cyclodextrin, confirming the existence of the host-guest inclusion complex, as shown in FIG. 13. No NOEs were observed between any of the fluorines and H1, H2, or H4. The intensities of the proton crosspeaks vary depending on the position of the fluorines, indicating relative distances. For the spectral slice of the 2D crosspeaks at F2, F3, and F4, H5 and H6 are dominant, whereas for the crosspeaks at F6 and F7, H3 is most intense. These results clearly show that the smaller opening of the cyclodextrin, with the primary hydroxyl groups, is facing the carboxylate head of PFDMMOBA, while the larger opening of the cyclodextrin, with the secondary hydroxyl groups, is facing the tail end of the PFECA, as shown in FIG. 13. The NOE patterns for the 1:1 and 2:1 β-CD:PFDMMOBA ratios are the same, confirming that only a 1:1 complex is formed as concluded from the titration studies.

Figure 14:
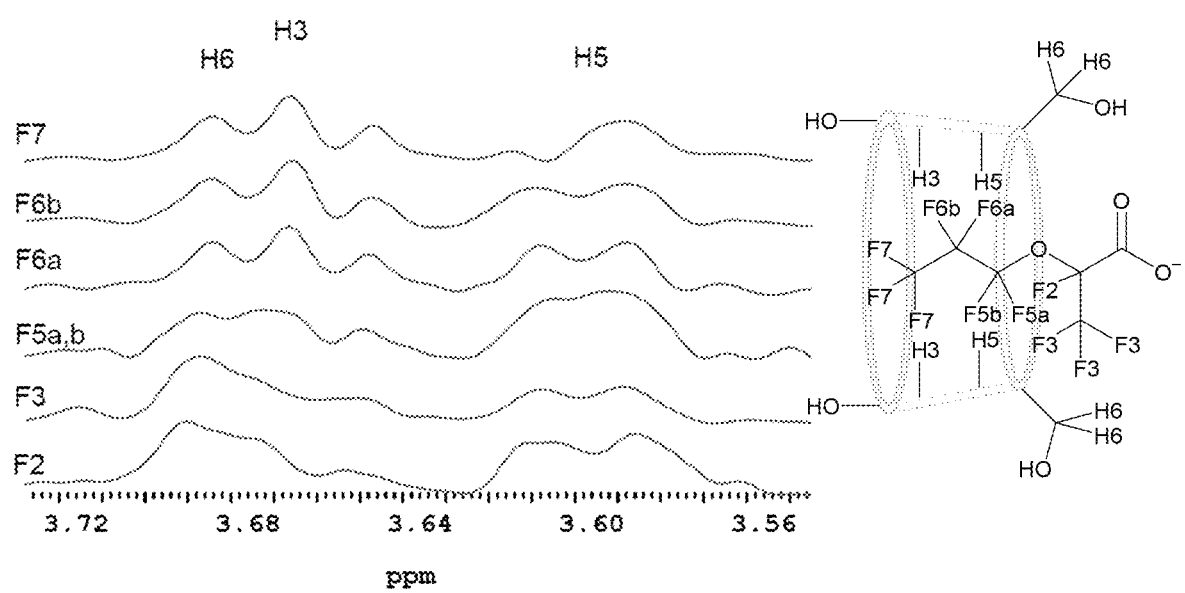
FIG. 14 shows a $^{19}F$-$^{1}H$ HOESY of β-CD:PFPrOPrA complex where the proton slices for each fluorine peak are shown with the host-guest structure is elucidated from the NOEs observed between each fluorine and proton. H3 is a triplet; H5 is a doublet; H6 is a broad singlet.
Figure 15:
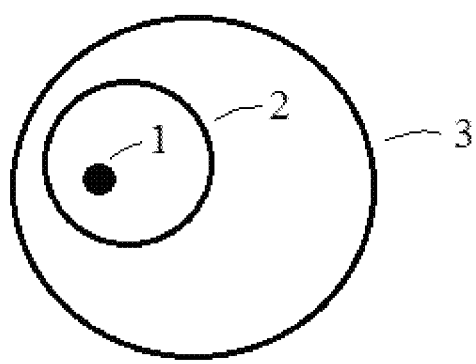
FIG. 15 shows the diagram of a delivery device 3 and the conceptual at least one CD 1 adsorbed in a vehicle additive 2.
Figure 16A:
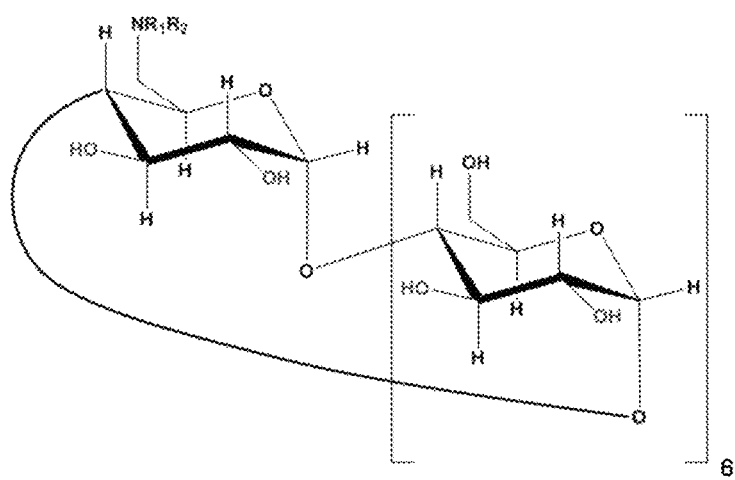
FIGS. 16A-16C show the exemplary amine modified β-CD that contains a single amine group at a single primary carbon (16A) or single secondary carbon (16B and 16C) of the β-CD by replacing a single hydroxyl group (—OH) at the single primary carbon or single secondary carbon of the β-CD with an amine group (—$NR_1R_2$, wherein $R_1$ and $R_2$ are independent hydrogen, or alkyl).
Figure 16B:
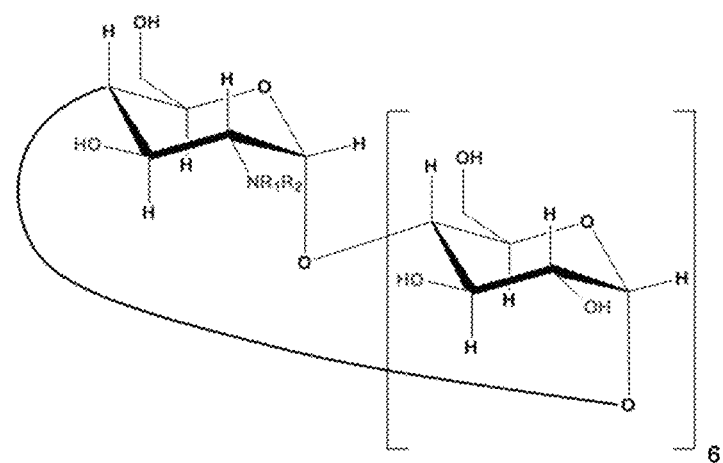
Figure 16C:
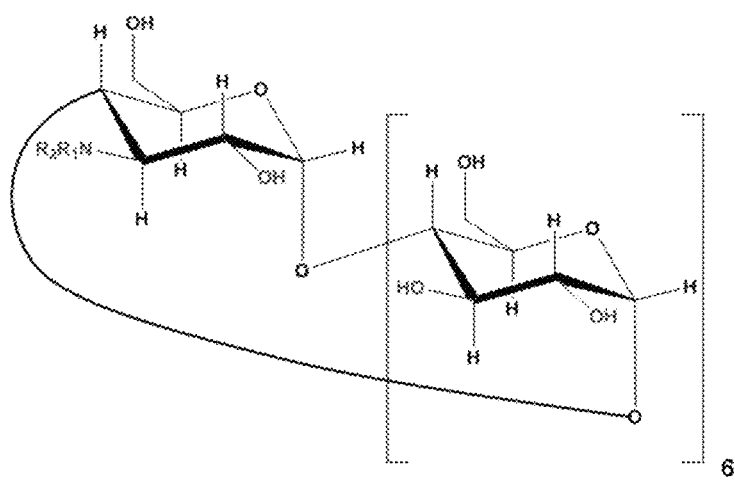

Likewise, all the fluorines of PFPrOPrA display crosspeaks with H3, H5, and H6 in the β-CD:PFPrOPrA complex, as pictured in FIG. 14. Again, no crosspeaks were observed between any fluorine and H1, H2, or H4. For the slices at F2 and F3, H5 and H6 are dominant; for F5, H5 is most intense; and for F6 and F7, H3 is dominant. Again, the cyclodextrin is oriented with the primary hydroxyl groups facing the carboxylate, pictured in FIG. 14. Only a 1:1 complex appears to be formed due to the same NOE pattern for both the 1:1 and 2:1 β-CD:PFPrOPrA ratios, confirming the results from the titration experiments.

It is clear from the HOESY spectra that the primary hydroxyl groups are oriented toward the PFAS carboxylate in the CD:PFAS host-guest complex, regardless of branching, suggesting an optimal geometry for the CD:PFAS complex. The primary hydroxyl groups are less sterically hindered and have more freedom of rotation than the secondary hydroxyl groups, which may make it more favorable for hydrogen-bonding between the primary hydroxyl groups of the CD and the carboxylate of the PFAS. Furthermore, the primary hydroxyl groups are further away from the bulk of the CD cavity, which would allow adequate separation of the PFAS chain-CD cavity interactions and the PFAS carboxylate-CD hydroxyl group interactions. These results support the conclusion that PFPrOPrA forms a weaker hostguest complex than PFDMMOBA with β-CD because of hindered hydrogen-bonding with the carboxylate due to the branched structure. Threading of the carboxylate through the CD cavity is also supported by the confirmed inclusion of PFDMMOBA by β-CD. Finally, the molecular sizes of PFASs, combined with the HOESY results, suggest that PFASs can enter the CD cavity by both the head and tail ends, as long as the primary hydroxyl side is facing the headgroup.

HSA Reverse Binding Studies

Chemicals

PFOA and hexafluorobenzene were purchased from Sigma-Aldrich. β-CD was purchased from Acros Organics. HSA (66,248 Da, ≥99% by agarose gel electrophoresis, fatty acid and globulin free) and deuterium oxide (99.9% D) were purchased from Sigma-Aldrich and stored at 4° C. All chemicals were used without further purification.

Sample Preparation

For the $^{19}F$ NMR experiments, a solution of 2.42 mM PFOA was prepared in 50% $D_2O$ and 50% 100 mM sodium phosphate buffer (pH 7.4) solution in $H_2O$. Hexafluorobenzene (1.44 mM) was added as an internal standard. Various stoichiometric ratios of β-CD were added to the PFOA solution, and the samples were sonicated to ensure dissolution. After analysis, HSA (35 μM) was added to each sample, and the samples were analyzed again. For the fluorescence spectroscopy experiments, stock solutions of PFOA (10 mM and 100 μM), β-CD (5 mM), and HSA (20 μM) were prepared with a 50 mM sodium phosphate buffer (pH 7.4) solution in polypropylene tubes $^{19}F$ NMR Spectroscopy NMR experiments were performed with a 400 MHz Bruker instrument with a quad probe (operating at 376.498 MHz for $^{19}F$). Hexafluorobenzene was used as the internal standard with a chemical shift of −164.9 ppm. The chemical shift of each peak was recorded, and the 1:1 and 2:1 β-CD:PFOA association constants were calculated in GraphPad Prism and Mathworks Matlab.

Fluorescence Spectroscopy

Steady state emission experiments were performed with a PC1 Fluorometer (ISS Inc, Champaign, Ill.). The excitation wavelength was 295 nm, and the emission spectra were recorded between 305 and 440 nm using 1 nm slit width for both excitation and emission. The emission spectra were corrected for the inner filter effect; however, the inner filter effect was insignificant at the HSA concentrations used in this study. Fluorescence lifetime experiments (frequency-resolved) were performed with a ChronoFD Fluorometer (ISS Inc, Champaign, Ill.). The excitation wavelength was 280 nm and 2,5-diphenyloxazole (PPO) was used as a lifetime reference. For both steady state and fluorescence lifetime experiments, the concentration of HSA was 10 βM. PFOA and β-CD were titrated into the sample at various concentrations.

Toxicity Studies

Materials

Perfluorooctanoic acid (PFOA, 96% purity) was purchased from Sigma-Aldrich. β-Cyclodextrin (β-CD, 98% purity) was purchased from Acros Organics. Both chemicals were used without further purification. Stock solutions of PFOA (7.25 mM, i.e., 3000 parts-per-million [ppm]), 1:1 β-CD:PFOA (β-CD: 7.25 mM, PFOA: 7.25 mM), and 2:1 β-CD:PFOA (β-CD: 14.50 mM, PFOA: 7.25 mM) were prepared with deionized water in polypropylene tubes. The solutions were sonicated until dissolution of the solids was achieved. A control solution of deionized water was also stored in a polypropylene tube. Stock solutions were subsequently diluted over a relevant range of concentrations for assessment of zebrafish embryo toxicity.

Zebrafish Rearing and Breeding

Adult zebrafish were maintained in 30-L tanks at 28° C. with 14 h:10 h light/dark cycle, and bred (from approximately 10-30 individuals) above 10-L tanks in mesh enclosures. Eggs were collected (from the bottom of tanks) within 1 h of the end of the dark cycle, and following collection and washing, transferred to plates containing E3 medium. Eggs containing dead, or obviously poor quality embryos, were removed. The remaining embryos were used, within ~2 hour post-fertilization (hpf), for toxicity assays.

Zebrafish Embryo Toxicity Assay Assays were conducted in polypropylene 24-well plates (Evergreen Scientific, Los Angeles, Calif.) with five embryos (4- to 32-cell stage) per replicate, i.e., well (n=4), in E3 medium for a total of 20 zebrafish embryos per treatment/concentration. Embryos were exposed to a range of PFOA concentrations (30, 50, 100, 150, 200, 250 and 300 ppm) alone, and in 1:1 and 2:1 ratios with β-CD, and subsequently observed at 1, 2, 3, 4 and 7 days post-fertilization (dpf) with a dissecting light microscope to assess mortality and relevant developmental toxicity. Exposures and assessments were repeated several times, in preliminary studies, to determine relevant concentration levels for PFOA, and generally confirm results. Lethality was calculated as the concentration corresponding to 50% mortality ($LC_{50}$); the $LC_{50}$ values, and their 95% confidence intervals, were calculated via Probit Analysis in SPSS. In addition to lethality, inhibition of embryo development was morphometrically assessed based on the interocular distance between eyes (as a proxy for body size) of 7 dpf embryos (i.e., eleuthero-embryo stage) as measured using Olympus DP2-BSW imaging software. Apparent neurobehavioral effects were additionally measured as the percent of 7-dpf eleuthero-embryos displaying listing (i.e., falling to one side) behavior within a 30 s period (with shaking between each measurement to allow embryos to right themselves).

Statistical Analyses

One-way analysis of variance (ANOVA) of the $LC_{50}$ values, as well as the interocular distance and percent listing at 7 dpf, was performed in GraphPad Prism. The significance level was set at p=0.05.

All publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A system for remediation of perfluoroalkyl substances (PFASs), comprising a delivery device having contained therein a mixture of at least one cyclodextrin (CD) adsorbed in a vehicle additive,
the at least one CD comprising an amine modified β-cyclodextrin (β-CD) that contains a single amine group at a single primary carbon or single secondary carbon of the β-CD by replacing a single hydroxyl group at the single primary carbon or single secondary carbon of the β-CD with an amine group, and the delivery device being a column, a pouch, a packet, or a sheet.

2. The system for remediation of PFASs according to claim 1, wherein the vehicle additive is powdered activated carbon (PAC).

3. The system for remediation of PFASs according to claim 1, wherein the delivery device is a column and the vehicle additive is powdered activated carbon.

4. A method for remediation of PFASs from an environment, comprising:
providing a system for remediation of PFASs according to claim 1;
contacting the system for remediation of PFASs with an environment; and
removing the PFAS comprising system for remediation of PFASs from the environment.

5. The method for remediation of PFASs from an environment according to claim 4, wherein the environment is a fluid environment.

6. The method for remediation of PFASs from an environment according to claim 4, wherein the environment is a soil environment.

7. The method for remediation of PFASs from an environment according to claim 4, wherein the environment is a solid surface.

8. The method for remediation of PFASs from an environment according to claim 4, wherein the environment is a plant or an animal.

9. The method for remediation of PFASs from an environment according to claim 4, wherein the vehicle additive is powdered activated carbon.

10. The method for remediation of PFASs from an environment according to claim 4, wherein the system is placed in a high ionic strength environment.

* * * * *